United States Patent
Lee

(10) Patent No.: US 10,565,073 B2
(45) Date of Patent: Feb. 18, 2020

(54) PEAK POWER CONTROL SYSTEM AND METHOD

(71) Applicant: LITE-ON, Inc., Milpitas, CA (US)

(72) Inventor: Victor K. J. Lee, Milpitas, CA (US)

(73) Assignee: LITE-ON, INC., Milpitas, CA (US)

( * ) Notice: Subject to any disclaimer, the term of this patent is extended or adjusted under 35 U.S.C. 154(b) by 181 days.

(21) Appl. No.: 15/803,493

(22) Filed: Nov. 3, 2017

(65) Prior Publication Data

US 2018/0060197 A1 Mar. 1, 2018

Related U.S. Application Data

(63) Continuation-in-part of application No. 15/004,585, filed on Jan. 22, 2016, now Pat. No. 9,965,365, which is a continuation-in-part of application No. 14/928,744, filed on Oct. 30, 2015, now Pat. No. 9,537,351, which is a continuation-in-part of
(Continued)

(51) Int. Cl.
| | |
|---|---|
| *G06F 11/00* | (2006.01) |
| *G06F 11/20* | (2006.01) |
| *G06F 1/30* | (2006.01) |

(52) U.S. Cl.
CPC ............ *G06F 11/2015* (2013.01); *G06F 1/30* (2013.01)

(58) Field of Classification Search
CPC .............................. G06F 11/2015; G06F 1/30
See application file for complete search history.

(56) References Cited

U.S. PATENT DOCUMENTS

| 5,315,533 A | * | 5/1994 | Stich ................ H02J 9/062 |
|---|---|---|---|
| | | | 307/66 |
| 5,612,580 A | | 3/1997 | Janonis |
| | | (Continued) | |

FOREIGN PATENT DOCUMENTS

| DE | 3031981 A1 | 4/1982 |
|---|---|---|
| DE | 10200802422 A1 | 2/2009 |
| | (Continued) | |

OTHER PUBLICATIONS

EPO, European Search Report for EP1419244 dated Jul. 10, 2015.
EPO, European Search Report for EP14199267 dated May 7, 2015.

*Primary Examiner* — Joseph D Manoskey
(74) *Attorney, Agent, or Firm* — David W. Carstens; J. Andrew Reed; Carstens & Cahoon, LLP

(57) ABSTRACT

A peak power control (PPC) system/method providing a uninterruptable power supply (UPS) to one or more protected load devices (PLD) supplied by power supply units (PSU) serviced by a primary power source (PPS) and a secondary power source (SPS) is disclosed. The PPS is configured to provide only a portion of peak power demand (PPD) required by the PSU to support the PLD power demand. During periods where power supplied by the PPS is insufficient to support the PLD power demand, the SPS augments the power supplied to the PSU to meet the PLD power demand. During periods where power supplied by the PPS is sufficient to meet the PLD power demand, the SPS is recharged by any excess power available from the PPS. Power provisioning controls (PPC) generate state control information (SCI) instructing the PLD to modulate computing clock speeds and/or prioritize PLD computing tasks in real-time.

14 Claims, 24 Drawing Sheets

Related U.S. Application Data application No. 14/925,754, filed on Oct. 28, 2015, now Pat. No. 9,537,341.

(60) Provisional application No. 62/523,641, filed on Jun. 22, 2017, provisional application No. 62/245,833, filed on Oct. 23, 2015, provisional application No. 62/245,826, filed on Oct. 23, 2015, provisional application No. 62/245,807, filed on Oct. 23, 2015.

(56) References Cited

U.S. PATENT DOCUMENTS

| | | | |
|---|---|---|---|
| 7,536,576 | B2 | 5/2009 | Shima |
| 8,010,823 | B2 | 8/2011 | Sartain |
| 8,193,662 | B1 * | 6/2012 | Carlson .................. H02J 9/061 |
| | | | 307/23 |
| 9,317,093 | B2 | 4/2016 | Uehara |
| 9,787,134 | B2 * | 10/2017 | Lecourtier ............ H02J 7/0068 |
| 2004/0164618 | A1 | 8/2004 | Bryde |
| 2005/0036253 | A1 | 2/2005 | Tian |
| 2005/0043859 | A1 | 2/2005 | Tsai |
| 2006/0050465 | A1 | 3/2006 | Cho et al. |
| 2006/0221523 | A1 | 10/2006 | Colombi |
| 2008/0258675 | A1 * | 10/2008 | Caldwell ........... H01L 31/02021 |
| | | | 320/101 |
| 2010/0180139 | A1 | 7/2010 | Denny et al. |
| 2011/0110009 | A1 | 5/2011 | Sugimoto |
| 2011/0291606 | A1 | 12/2011 | Lee |
| 2012/0044607 | A1 | 2/2012 | Loewe |
| 2012/0081078 | A1 | 4/2012 | Matsumura et al. |
| 2012/0086269 | A1 | 4/2012 | Nakano et al. |
| 2012/0311352 | A1 | 12/2012 | Luo |
| 2013/0020872 | A1 | 1/2013 | Kinnard |
| 2013/0043929 | A1 | 2/2013 | Chen |
| 2013/0141828 | A1 | 6/2013 | Yamaguchi et al. |
| 2013/0198537 | A1 | 8/2013 | Uehara |
| 2013/0246815 | A1 | 9/2013 | Uehara |
| 2013/0339757 | A1 * | 12/2013 | Reddy .................. G06F 1/3212 |
| | | | 713/300 |
| 2014/0001861 | A1 | 1/2014 | Mann |
| 2014/0001871 | A1 | 1/2014 | Vogman |
| 2014/0097690 | A1 | 4/2014 | Costa |
| 2014/0101464 | A1 | 4/2014 | Hsiao |
| 2014/0354047 | A1 * | 12/2014 | Markhovsky ......... H02J 7/0068 |
| | | | 307/23 |
| 2016/0006299 | A1 | 1/2016 | Myhre |
| 2016/0285267 | A1 * | 9/2016 | Stone ....................... H02J 3/32 |
| 2016/0322828 | A1 * | 11/2016 | Vogel .................... H02J 7/0068 |
| 2017/0203850 | A1 * | 7/2017 | Wang .................... B64C 39/024 |

FOREIGN PATENT DOCUMENTS

| | | |
|---|---|---|
| EP | 2833504 A1 | 2/2015 |
| KR | 101322617 B1 | 10/2013 |

\* cited by examiner

Prior Art

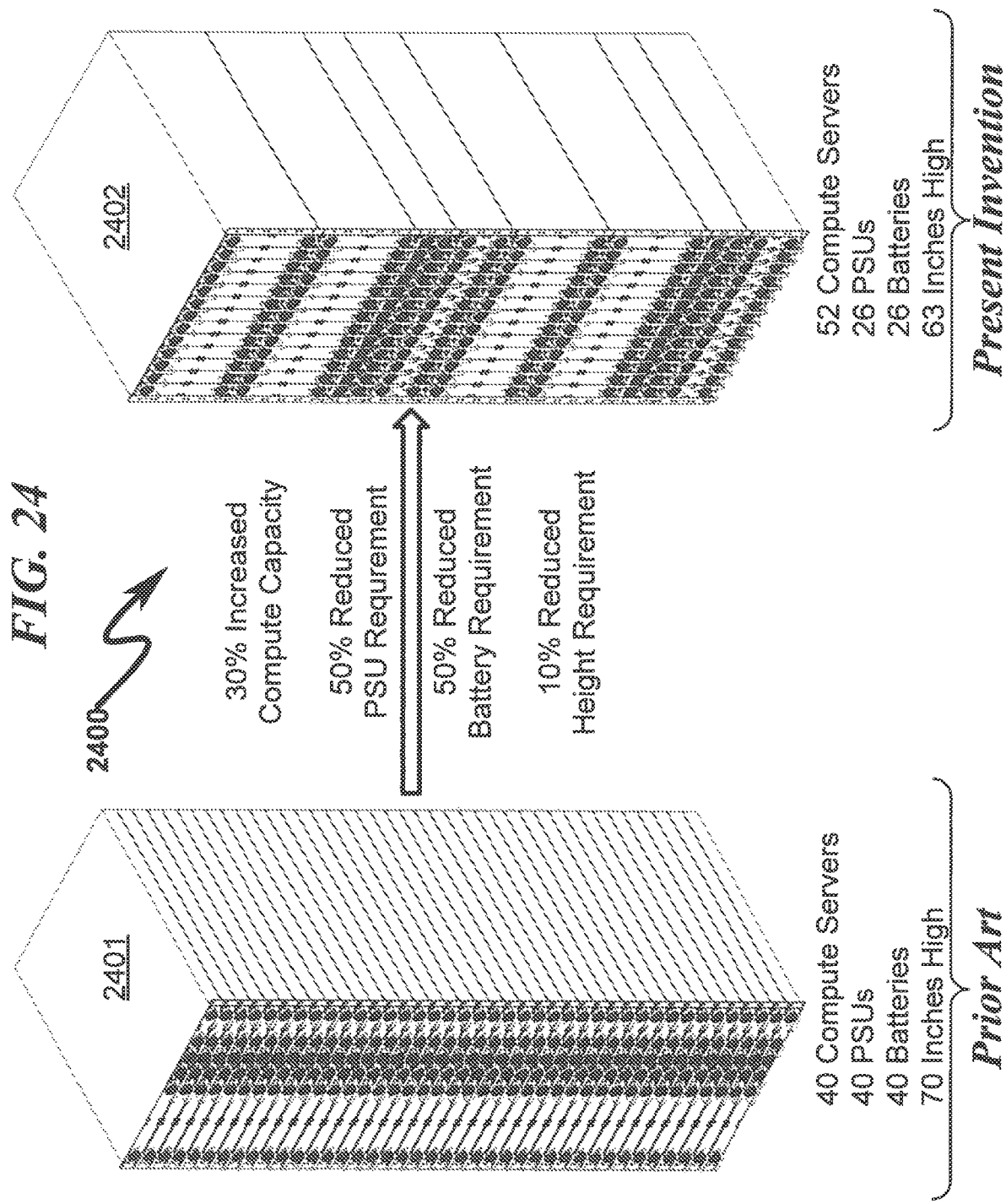

PEAK POWER CONTROL SYSTEM AND METHOD

CROSS-REFERENCE TO RELATED APPLICATIONS

This is application claims priority from U.S. Provisional Application No. 62/523,641, filed Jun. 22, 2017 and is a continuation-in-part of U.S. patent application Ser. No. 15/004,585, filed Jan. 22, 2016; which is a continuation-in-part of U.S. patent application Ser. No.14/928,744 filed Oct. 30, 2015, now U.S. Pat. No. 9,537,351 issued on Jan. 3, 2017; which is a continuation-in-part of U.S. patent application Ser. No. 14/925,754, filed Oct. 28, 2015, now U.S. Pat. No. 9,537,341, issued on Jan. 3, 2017; claims priority from U.S. Provisional Application Nos. 62/245,833, 62/245,826, and 62/245,807, each filed on Oct. 23, 2015; and is a continuation-in-part of U.S. patent application Ser. No. 14/843,880, filed Aug. 2, 2015, now U.S. Pat. No. 9,444,280, issued on Sep. 13, 2016; which is a continuation of U.S. patent application Ser. No. 14/565,754, filed Dec. 10, 2014, now U.S. Pat. No. 9,509,158, issued on Nov. 29, 2016; which is a continuation-in-part of U.S. patent application Ser. No. 14/509,454, filed Oct. 8, 2014, now U.S. Pat. No. 9,047,075, issued on Jun. 2, 2015; which is a continuation of U.S. patent application Ser. No. 14/461,110, filed Aug. 15, 2014, now U.S. Pat. No. 9,047,076, issued on Jun. 2, 2015; which claims priority from U.S. Provisional Application No. 61/922,311, filed Dec. 31, 2013; all of which the disclosure of each of the above-mentioned applications and/or patents is fully incorporated herein by reference.

FIELD OF THE INVENTION

The present invention generally relates to systems and methods associated with uninterruptable power supplies (UPS). Specifically, the present invention relates in some preferred embodiments to UPS peak power control systems/methods as applied to large computing data centers. Without limitation, the present invention attempts to serve the peak loading requirements of data centers with a secondary power source (SPS) that supplements a baseline primary power source (PPS) that serves the non-peak power demands of compute server farm.

PRIOR ART AND BACKGROUND OF THE INVENTION

Within the context of modern data centers, there is a need to provide for uninterrupted power to protected load devices that are serviced by power supply units (PSU). The PSU architecture described in United States patent applications incorporated by reference herein (Ser. Nos. 15/004,585; 14/461,110; and Ser. No. 14/509,454) may be configured in a variety of ways to ensure that this requirement for uninterrupted protected load power supply is achieved. The present invention describes a variety of peak power control systems/methodologies to achieve this desired result. With this new methodology, the power supplies servicing a compute server farm need not be configured to supply the peak power demands of the server farm, but merely be configured to support non-peak power demands at or below a predetermined loading level (PLL).

BRIEF SUMMARY OF THE INVENTION

The present invention augments the AC+DC peak power controls detailed in United States patent applications incorporated by reference herein (Ser. Nos. 15/004,585; 14/461,110; and Ser. No. 14/509,454) by providing for a variety of systems and methods to ensure uninterrupted service to protected load devices via monitoring of power supply sources (PSS) and digitally controlled switching of these PSS to AC+DC power supplies that service the protected load devices.

A peak power control (PPC) system/method providing a digitally controlled uninterruptable power supply (UPS) to a protected load device (PLD) is disclosed. The UPS is configured as power supply units (PSU) serviced by a power supply source (PSS) and a peak power source (PPS). The PSU supplies power to the PLD to a predetermined load level (PLL) of PLD power consumption. Above the PLL, a secondary battery PPS is used to source additional power to the PLD to satisfy peak power demands of the PLD above the PLL. During periods of PLD loading below the PLL, the battery PPS is recharged using power supplied by the PSS. The augmentation of the PSS by the PPS permits the system to support temporary peak power loading by the PLD while simultaneously reducing the overall cost of implementing the PSS during below-PLL levels of power consumption by the PLD.

BRIEF DESCRIPTION OF THE DRAWINGS

For a fuller understanding of the advantages provided by the invention, reference should be made to the following detailed description together with the accompanying drawings wherein:

FIG. 24 illustrates a physical and functional comparison of the prior art rackmount compute server depicted in FIG. 20 and a corresponding exemplary present invention rackmount compute server depicted in FIG. 23.

DESCRIPTION OF THE PRESENTLY PREFERRED

Exemplary Embodiments

Figure 1:
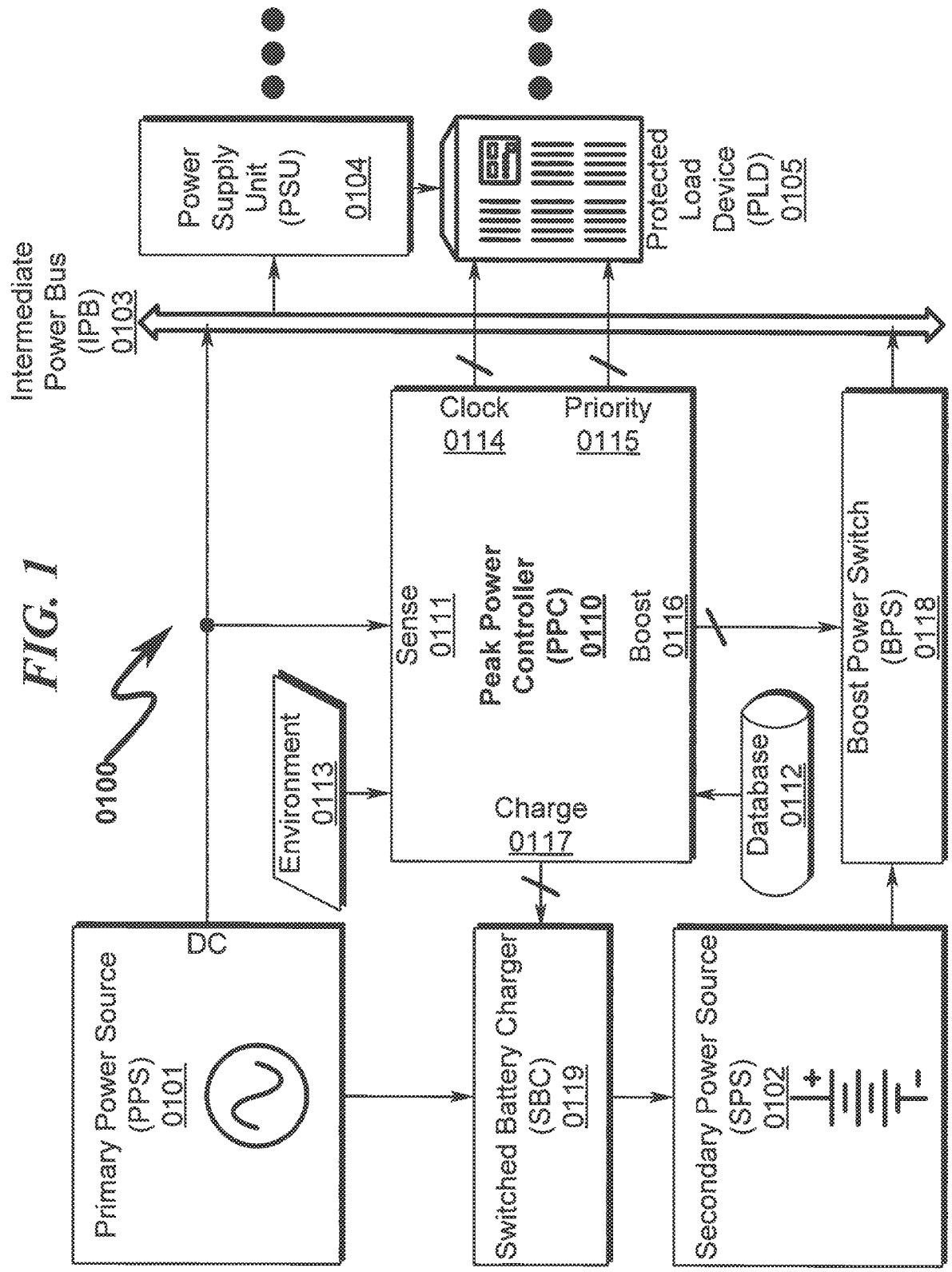
FIG. 1 illustrates a block diagram of a preferred exemplary system embodiment of the present invention.

While this invention is susceptible to embodiment in many different forms, there is shown in the drawings and will herein be described in detailed preferred embodiments of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a PEAK POWER CONTROL SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Switch Methodology not Limitive

The present invention will be discussed in the context of a variety of boost converter topologies, some of which are preferred depending on application context. These converter topologies will be shown to incorporate MOSFET electrical switches, but the present invention is not limited in scope to the use of these devices and may incorporate any form of electrical switch, such as (but not limited to) bipolar transistors, MOSFETs, IGBTs, etc.

Control System not Limitive

The present invention may utilize a wide variety of constructs when implementing the power controller described herein. Many preferred invention embodiments may utilize a computerized control mechanism wherein the computer system executes machine instructions read from a tangible, non-transitory, computer readable medium.

PSU Limitive

The present invention describes controlled connections between power supply sources (PSS) and protected load devices (PLD). In this context the PLDs are limited in scope to power supply units (PSU) as described in U.S. patent application Ser. Nos. 15/004,585; 14/461,110; and 14/509,454 incorporated herein by reference. Thus, the system described herein is designed as a "front-end" to the uninterruptable power supply (UPS) systems described in this referenced patent application.

System Overview (0100)-(0200)

Figure 2:
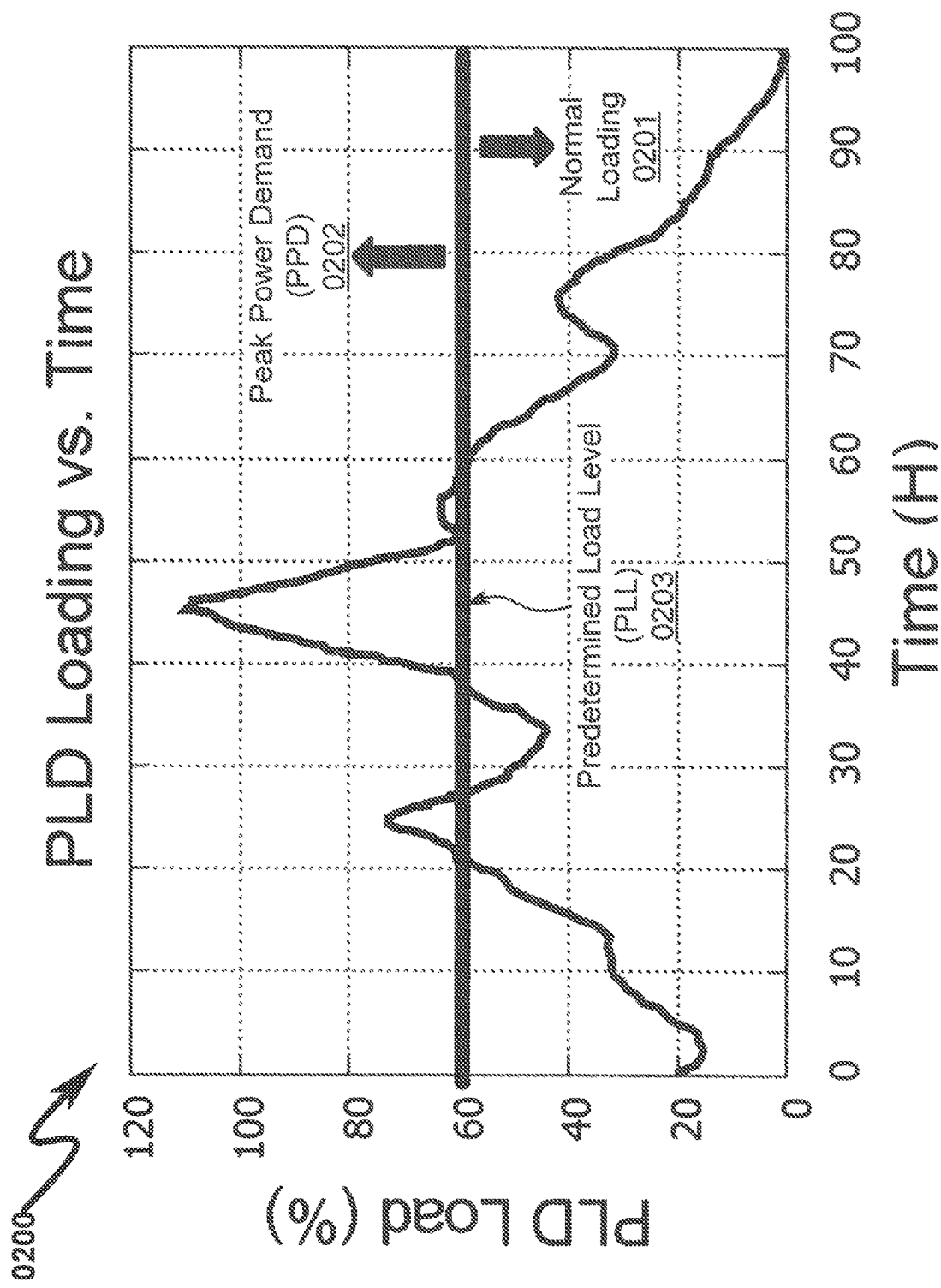
FIG. 2 illustrates an exemplary graph depicting protected load device (PLD) loading over time and the demarcation between a normal PLD loading and peak loading by a predetermined load level (PLL)

A preferred exemplary system embodiment of the present invention is depicted in FIG. 1 (0100) with an exemplary performance characteristic depicted in FIG. 2 (0200). In this application context, peak power control (PPC) unit (0110) coordinates operation of a boost power switch (BPS) (0118) and a switched battery charger (SBC) (0119) to control power delivery from a primary power source (PPS) (0101) and a secondary power source (SPS) (0102) to an intermediate power bus (IPB) (0103) that supplies power to a power supply unit (PSU) (0104) that services DC power to a protected load device (PLD) (0105). Within this context the PPS (0101) is configured to service only a portion of peak power demand (PPD) required by the PSU (0104) to service the PLD (0105). Within this application context the PLD (0105) typically constitutes a computing server or other similar digital computing device as may be encountered in a server farm or other arrayed computing arrangement. As the power demands of the PLD (0105) may vary based on server loading and other time-dependent factors as generally depicted in FIG. 2 (0200), the power service requirements of the PSU (0104) with respect to the IPB (0103) will necessarily be time dependent. As generally depicted in FIG. 2 (0200), the normal average power demands (0201) associated with the PLD (0105) loading may only represent a fraction of peak power demands (0202) of the PLD (0105) and as such the power supplied by the PSU (0104) may vary accordingly.

Traditional prior art power supply implementations would require that the peak power demand (PPD) (0202) by the PSU (0104)/PLD (0105) be directly supported by the PPS (0101). It should be noted that due to inherent inefficiencies in the PSU (0104), total power required by the PPS (0101) will exceed that of just the PLD (0105). Any failure of the PPS (0101) to supply sufficient power to meet the PPD required by the PSU (0104)/PLD (0105) combination would result in a voltage drop on the IPB (0103) and typically result in a loss of computing reliability in the PLD (0105) due to out-of-tolerance power supply operating voltages.

In contrast to this prior power supply design methodology, the present invention as depicted in FIG. 1 (0100) specifies a PPS (0101) that is capable of supplying only a portion of the required PPD (0202) of the PSU (0104)/PLD (0105) to a predetermined load level (PLL) (0203) as indicated in FIG. 2 (0200). As generally illustrated in FIG. 2 (0200), the remainder of the peak power demand (PPD) (0202) time-dependent power required by the PSU (0104)/PLD (0105) combination is dynamically supplied by the secondary power source (SPS) (0102) via the boost power switch (BPS) (0118) to the IPB (0103).

As indicated in FIG. 1 (0100), the PPC (0110) dynamically senses the IPB (0103) bus voltage via the SENSE input (0111) and uses this information to determine operation of the overall control system. As the PLD (0105) consumes more power, the PPS (0101) will supply power to a predetermined load level (PLL) (0203) as indicated in FIG. 2 (0200). This PLL loading threshold may vary based on operational database parameters (0112) of the PPC (0110) and other environmental factors (0113), such as electric power rates, HVAC operational parameters, current time-of-day/week/month/year, projected loading profiles, cyclic historical loading profiles, time-of-day historical loading profiles, and other environmental and/or economic operational factors relating to the operation of the computing server farm. This environmental information (0113) supplied to the PPC (0110) is used in conjunction with the SENSE input (0111) to the PPC (0110) to optionally affect dynamic operation of a computing CLOCK (0114) and PRIORITY (0115) controls provided to the PLD (0105) to determine clocking speed and priority of computing tasks within the context of the PLD (0105) environment. Given these control parameters (0111, 0112, 0113), if the SENSE (0111) input detects a downward bus voltage variation in the IPB (0103), the BOOST (0116) control signal is activated to enable the BPS (0118) to supply additional power from the SPS (0102) to the IPB (0103) thus raising the IPB (0103) bus voltage to an acceptable level. The BOOST (0116) control signal may in some embodiments be a switched signal to modulate the operation of the BPS (0118) when supplying power from the SPS (0102) to the IPB (0103). Any of the CLOCK (0114), PRIORITY (0115), BOOST (0116), and CHARGE (0117) control lines may be multi-signal/multi-conductor to affect parallel control of these functions or in some circumstances implemented using serial bus hardware.

During periods where the PLD (0105) consumes power at a level less than or equal to the PLL loading threshold (0203), the PPC (0110) activates a CHARGE (0117) control that activates a switched battery charger (SBC) (0119) to transfer power from the PPS (0101) to maintain proper battery charge levels for the SPS (0102). Note that this charging function may be used in conjunction with database (0112) and/or environmental information (0113) to supply more peak power from the SPS (0102) during times of high electricity costs and recharge the SPS (0102) during times of lower electricity costs. This approach may also be used to mitigate HVAC cooling costs for the computing server farm by utilizing the SPS (0102) during periods where HVAC cooling costs are at a maximum for the facility.

Exemplary BOOST/CHARGE Logic (0300)-(0400)

Figure 3:
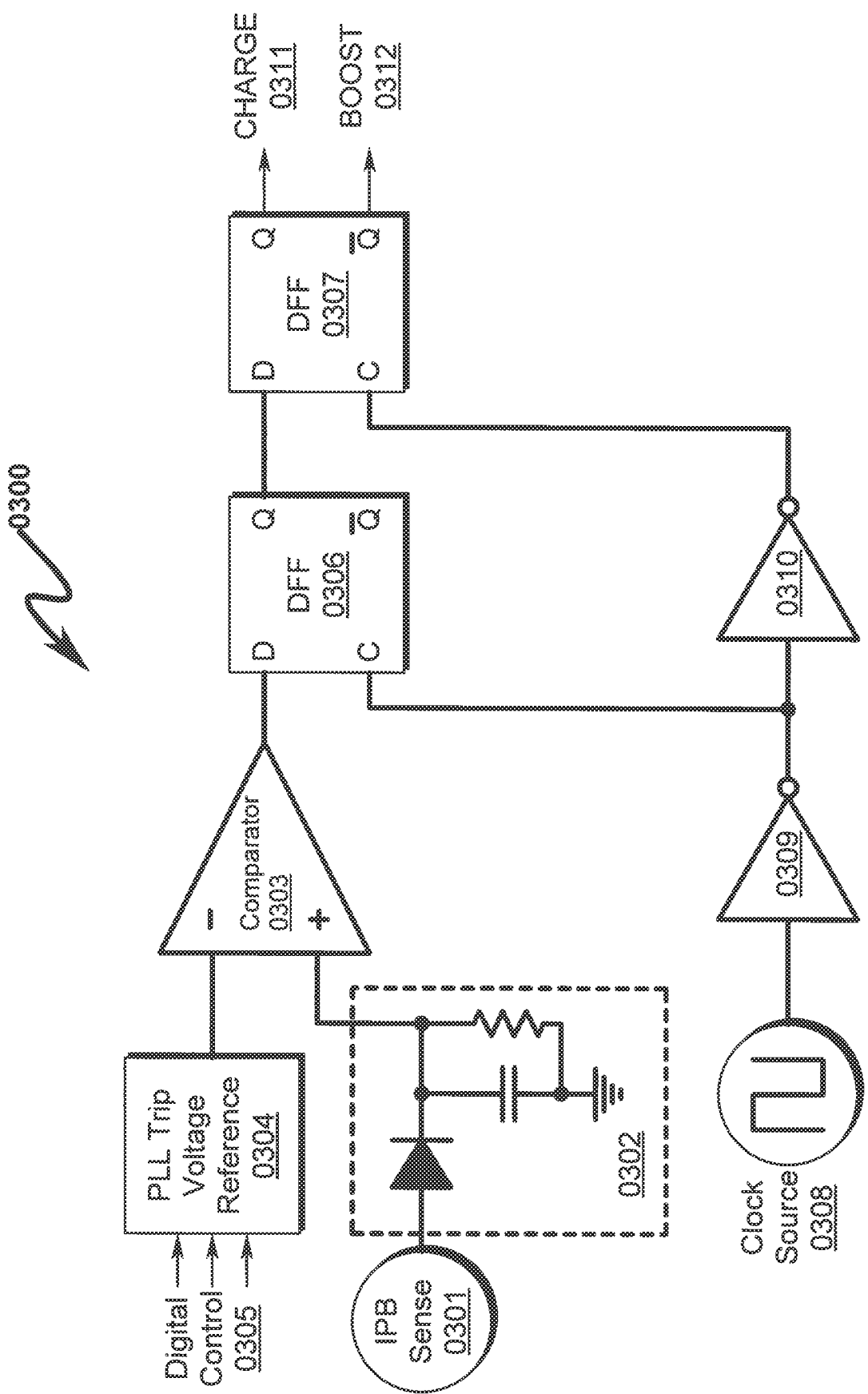
FIG. 3 illustrates a block diagram of a preferred exemplary system embodiment of the present invention detailing generation of BOOST and CHARGE control signals implemented with a comparator and reference voltage.

An exemplary implementation of the BOOST/CHARGE logic is generally depicted in the preferred exemplary embodiment in FIG. 3 (0300). Here it can be seen that the IPB voltage is sensed (0301) and filtered by a peak voltage detector with lossy integration (0302) and compared (0303) to a voltage reference (0304) representing the PLL loading threshold (0203). This voltage reference (0304) may be modulated by digital computer control (0305) based on database information (0112) and environmental factors (0113) as previously discussed.

The comparator (0303) dynamically compares the reference voltage (0304) to the filtered state (0302) of the IPB voltage (0301) to produce a digital signal that is a logic-1 if the IPB voltage is above the PLL trip level of the reference voltage (0304) and a logic-0 if below the PLL trip voltage reference (0304). This digital logic information is then fed through a series of D-flip-flop latches (0306, 0307) synchronized by a digital clock source (0308) and two-phase inverter chain (0309, 0310) to avoid metastable latching of the comparator (0303) status and produce a CHARGE (0311) and BOOST (0312) output control signals.

In this preferred exemplary embodiment, comparator (0303) detection of a IPB bus voltage (0301) above the PLL reference voltage (0304) will trigger activation of the CHARGE (0311) control line and deactivation of the BOOST (0312) control line. Conversely, if the IPB bus voltage (0301) is detected by the comparator (0303) as below the PLL reference voltage (0304), the CHARGE (0311) control line is deactivated and the BOOST (0312) control line is activated. Note that the lossy peak detection filter (0302) in conjunction with the DFF flip-flops (0306, 0307) ensures that the system response is not instantaneously but rather delayed to ensure overall system stability.

Figure 4:
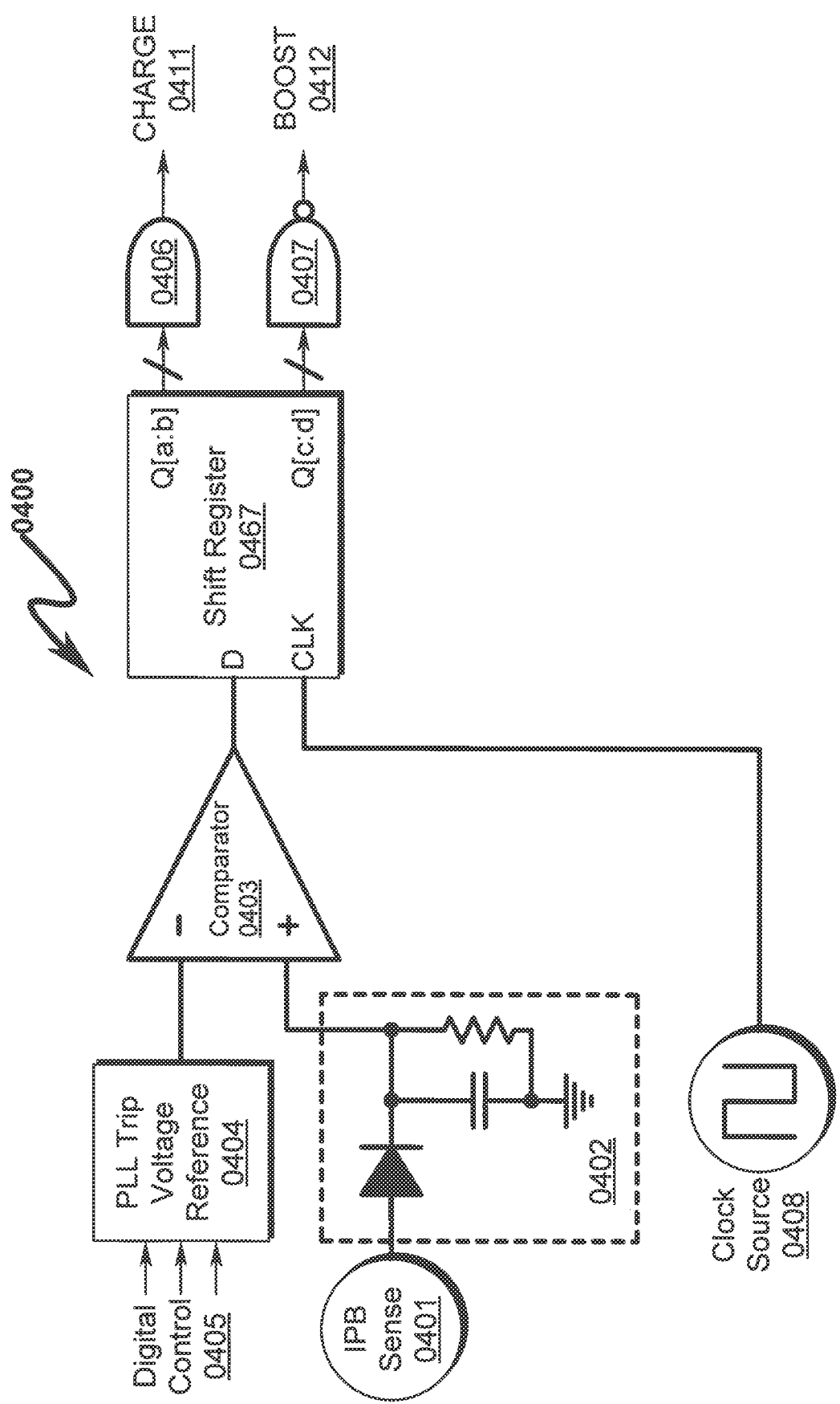
FIG. 4 illustrates a block diagram of a preferred exemplary system embodiment of the present invention detailing generation of BOOST and CHARGE control signals implemented with a comparator, reference voltage, and shift register.

As generally depicted in FIG. 4 (0400), the DFF flip-flops (0306, 0307) may incorporate additional delay elements to implement a shift register (0467) and/or logic (0406, 0407) to ensure that minor peak loading events are ignored by the system, as temporary minor variations in the IPB voltage below the PLL level may be acceptable. Here it can be seen that the IPB voltage is sensed (0401) and filtered by a peak voltage detector with lossy integration (0402) and compared (0403) to a voltage reference (0404) representing the PLL loading threshold (0203). This voltage reference (0404) may be modulated by digital computer control (0405) based on database information (0112) and environmental factors (0113) as previously discussed. The comparator (0403) dynamically compares the reference voltage (0404) to the filtered state (0402) of the IPB voltage (0401) to produce a digital signal that is a logic-1 if the IPB voltage is above the PLL trip level of the reference voltage (0404) and a logic-0 if below the PLL trip voltage reference (0404).

In this alternative preferred embodiment, the clock source (0408) shifts comparator (0403) data into a shift register (0467) having Q outputs that are pattern sampled by logic (0406, 0407) to determine whether strings of comparator (0403) data match pattern lengths (shift register outputs Q[a:b] and Q[c:d]) required to activate the CHARGE (0411) and BOOST (0412) control lines. Note that with this configuration it is possible to have scenarios wherein neither the CHARGE (0411) nor BOOST (0412) control lines is active, as in scenarios where the IPB voltage hovers around the PLL trip threshold but does not remain above or below this threshold for a sufficiently long time to warrant boosting the IPB voltage with secondary power or charging the secondary power source via the PPS.

PLL Hysteresis (0500)-(0700)

Figure 5:
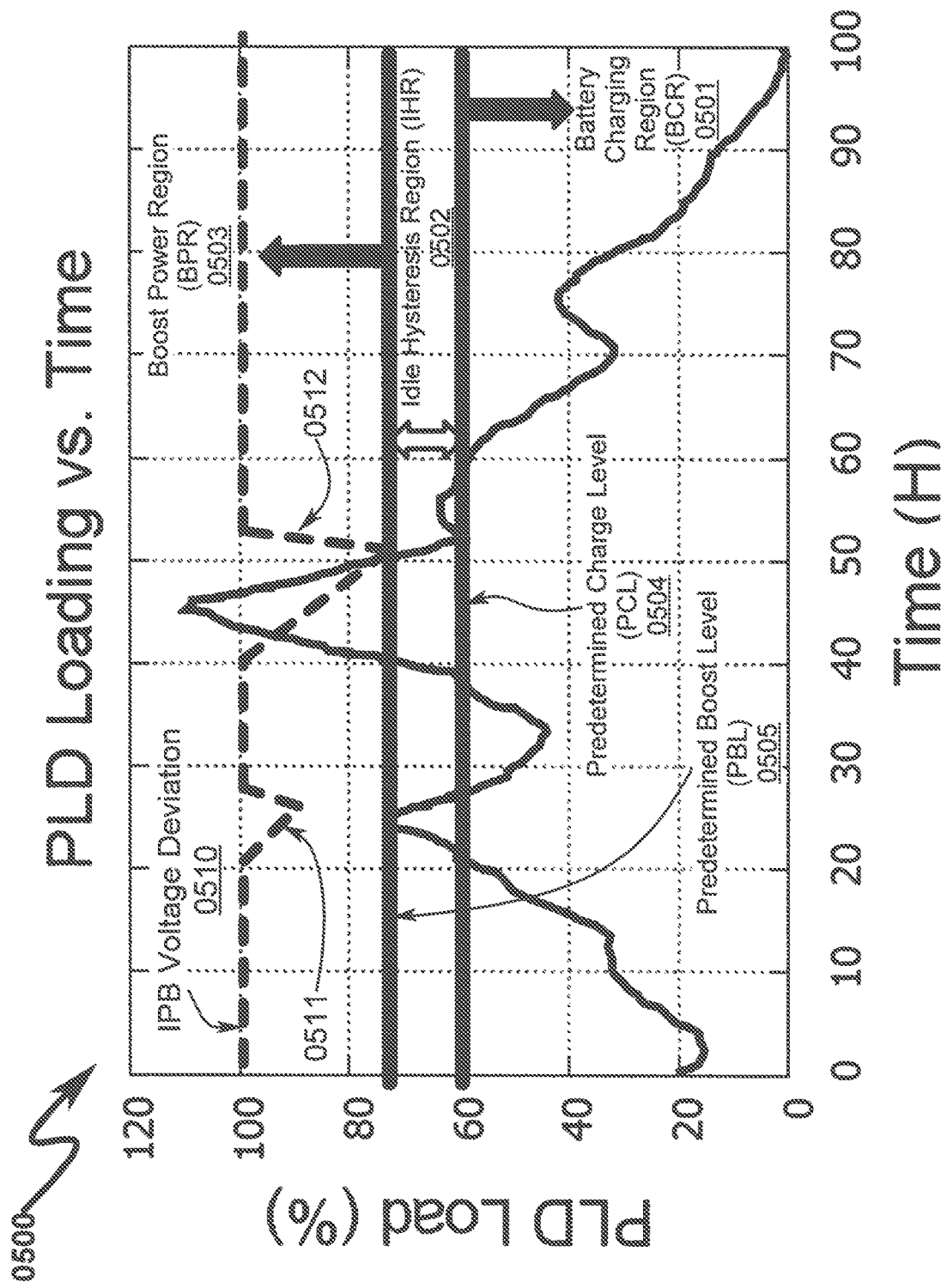
FIG. 5 illustrates an exemplary graph depicting protected load device (PLD) loading over time and the demarcation between a normal PLD loading and peak loading by a predetermined load level (PLL) incorporating a region of hysteresis.

As depicted in FIG. 5 (0500), the PLL threshold that delineates normal system operation from that where the SPS is activated to supply additional power to the IPB/PLD may incorporate hysteresis such that the operating modes comprise a battery charging region (BCR) (0501) in which the SPS is recharges, an idle hysteresis region (IHR) (0502) in which no state transitions occur, and a boost power region (BPR) (0503) in which power is transferred from the SPS to the IPB. Associated with these regions are a predetermined charge level (PCL) (0504) at or below which the SPS recharging is allowed to occur and a predetermined boost level (PBL) (0505) above which power is transferred from the SPS to the IPB to supply peak power required by the PLD.

Also depicted in FIG. 5 (0500) is the IPB voltage deviation (0510) due to the PLD peak power demand excursions. As can be seen from the diagram, the hysteresis behavior of the system as depicted permits minor IPB voltage variations (0511) due to peak PLD power demands to be ignored unless they deviate sufficiently to cause significant IPB voltage variations (0512) which will trigger activation of the SPS power to supplement the IPB and raise the IPB voltage to an acceptable level.

Figure 6:
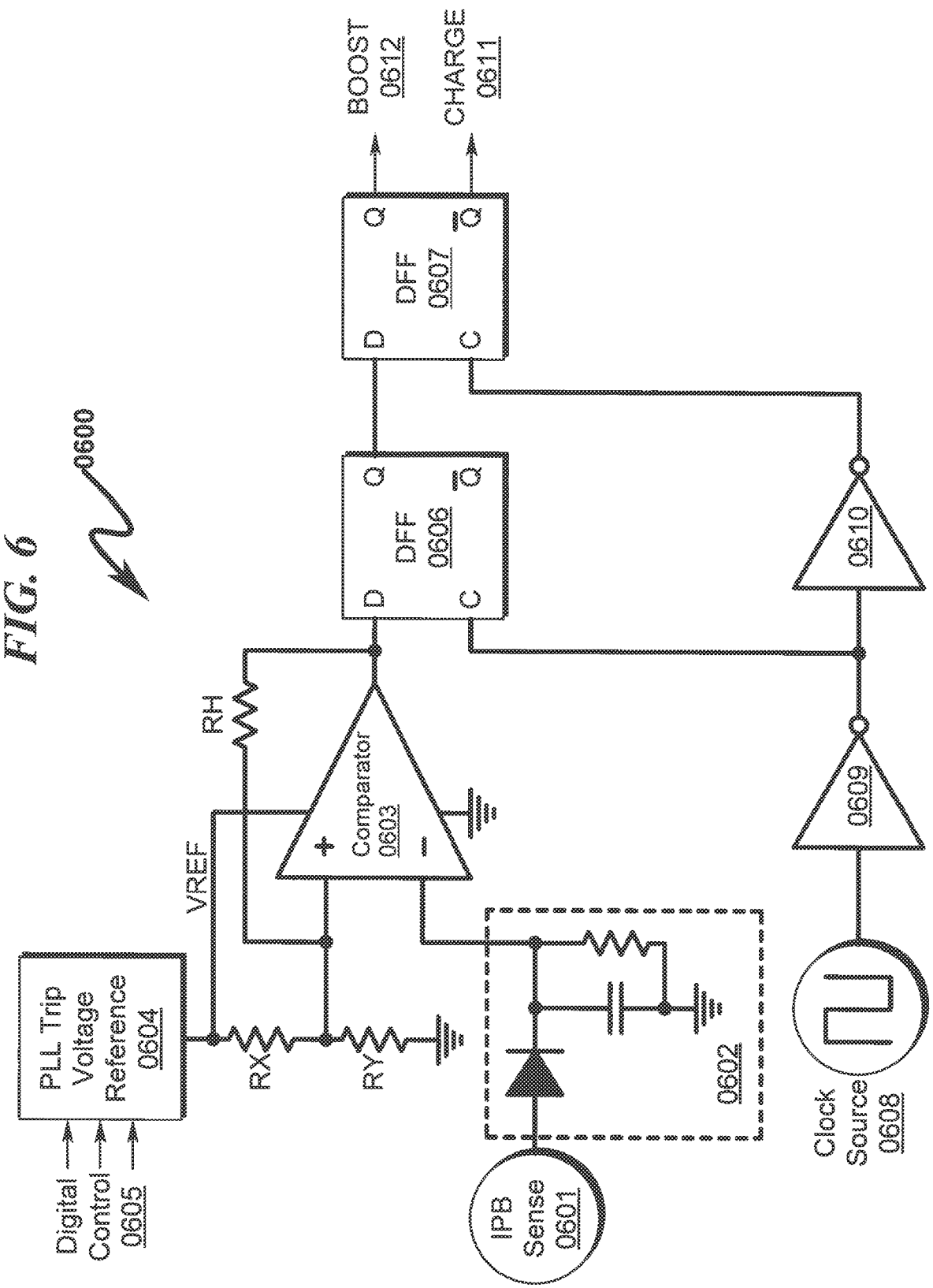
FIG. 6 illustrates a block diagram of a preferred exemplary system embodiment of the present invention detailing generation of BOOST and CHARGE control signals implemented with a comparator incorporating hysteresis and reference voltage.

An exemplary implementation of this hysteresis behavior is generally depicted in FIG. 6 (0600) wherein the logic sense of the comparator (0603), CHARGE (0611), and BOOST (0612) logic outputs has been reversed and the comparator (0603) has been augmented with resistors RX, RY, and RH to implement hysteresis in the behavior of the system. Here it can be seen that the IPB voltage is sensed (0601) and filtered by a peak voltage detector with lossy integration (0602) and compared (0603) to a voltage reference (0604) that has been augmented with resistors RX, RY, and RH. This voltage reference (0604) may be modulated by digital computer control (0605) based on database information (0112) and environmental factors (0113) as previously discussed. This digital logic information is then fed through a series of D-flip-flop latches (0606, 0607) synchronized by a digital clock source (0608) and two-phase inverter chain (0609, 0610) to avoid metastable latching of the comparator (0603) status and produce a BOOST (0611) and CHARGE (0612) output control signals.

The relationship between the comparator (0603) output and the sensed IPB voltage (0601) is given by the relations:

$$\frac{R_H}{R_L} = \frac{V_L}{V_H - V_L} \quad (1)$$

as shown by the following derivation:

$$V_L = \frac{\frac{R_Y R_H}{R_Y + R_H}}{R_X + \frac{R_Y R_H}{R_Y + R_H}} V_{REF} = \frac{R_H R_Y}{R_H R_X + R_H R_Y + R_X R_Y} V_{REF} \quad (2)$$

$$V_H = \frac{R_Y}{R_Y + \frac{R_X R_H}{R_X + R_H}} V_{REF} = \frac{R_H R_Y + R_X R_Y}{R_H R_X + R_H R_Y + R_X R_Y} V_{REF} \quad (3)$$

$$V_H - V_L = \frac{R_Y}{R_Y + \frac{R_X R_H}{R_X + R_H}} V_{REF} = \frac{R_X R_Y}{R_H R_X + R_H R_Y + R_X R_Y} V_{REF} \quad (4)$$

$$\frac{V_L}{V_H - V_L} = \left(\frac{R_H R_Y}{R_H R_X + R_H R_Y + R_X R_Y}\right)\left(\frac{R_H R_X + R_H R_Y + R_X R_Y}{R_X R_Y}\right) = \frac{R_H}{R_X} \quad (5)$$

The relationship between RX and RY is provided as follows:

$$\frac{R_Y}{R_X} = \frac{V_L}{V_{REF} - V_H} \quad (6)$$

as shown by the following derivation:

$$V_{REF} - V_H = V_{REF} - \left(\frac{R_H R_Y + R_X R_Y}{R_H R_X + R_H R_Y + R_X R_Y}\right) V_{REF} \quad (7)$$

$$V_{REF} - V_H = \left(\frac{R_H R_Y}{R_H R_X + R_H R_Y + R_X R_Y}\right) V_{REF} \quad (8)$$

$$\frac{V_L}{V_{REF} - V_H} = \quad (9)$$

$$\left(\frac{R_H R_Y}{R_H R_X + R_H R_Y + R_X R_Y}\right) V_{REF} \left(\frac{R_H R_X + R_H R_Y + R_X R_Y}{R_H R_Y V_{REF}}\right)$$

$$\frac{V_L}{V_{REF} - V_H} = \frac{R_Y}{R_X} \quad (10)$$

Equations (1) and (6) can be used to select the VH (PBL voltage) and VL (PCL voltage) and then resistor RX is arbitrarily chosen based on desired current consumption characteristics for the comparator. At this point the remaining resistor RY can be calculated from the above equations.

Figure 7:
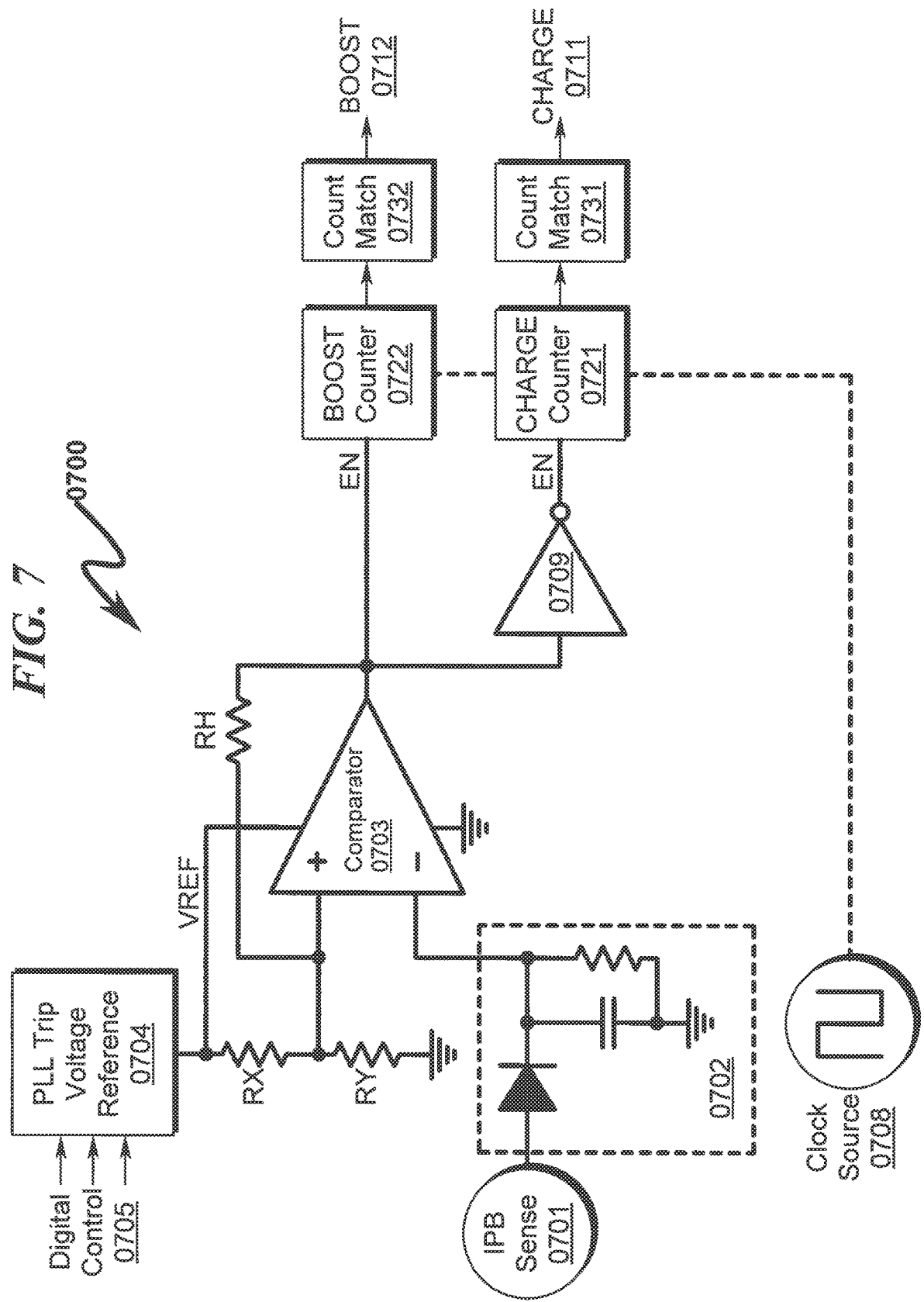
FIG. 7 illustrates a block diagram of a preferred exemplary system embodiment of the present invention detailing generation of BOOST and CHARGE control signals implemented with a comparator incorporating hysteresis, a reference voltage, and digital counters.

As generally depicted in FIG. 7 (0700), digital counters may be used to implement hysteresis with delayed action to activate the CHARGE (0711) and BOOST (0712) control signals as follows. Here it can be seen that the IPB voltage is sensed (0701) and filtered by a peak voltage detector with lossy integration (0702) and compared (0703) to a voltage reference (0704) that has been augmented with resistors RX, RY, and RH. This voltage reference (0704) may be modulated by digital computer control (0705) based on database information (0112) and environmental factors (0113) as previously discussed.

Here the comparator (0703) is used as an ENABLE to determine operation of a CHARGE counter (0721) and a BOOST counter (0722) that are sequentially clocked when enabled from a clock source (0708). The CHARGE counter (0721) and BOOST counter (0722) are preloaded on state transitions of the ENABLE signal from the comparator (0703) to count transitions of the clock source (0708), and in an exemplary embodiment of the present disclosure the ENABLE signal is inverted (0709) to the CHARGE counter (0721). Corresponding CHARGE match (0731) and BOOST match (0732) registers determine when the CHARGE counter (0721) and BOOST counter (0722) have reached a predetermined time threshold at which time the corresponding CHARGE (0711) and BOOST (0712) signals are activated to either recharge the SPS or supplement the IPB with power sourced from the SPS.

Peak Power Clocking (0800)

Figure 8:
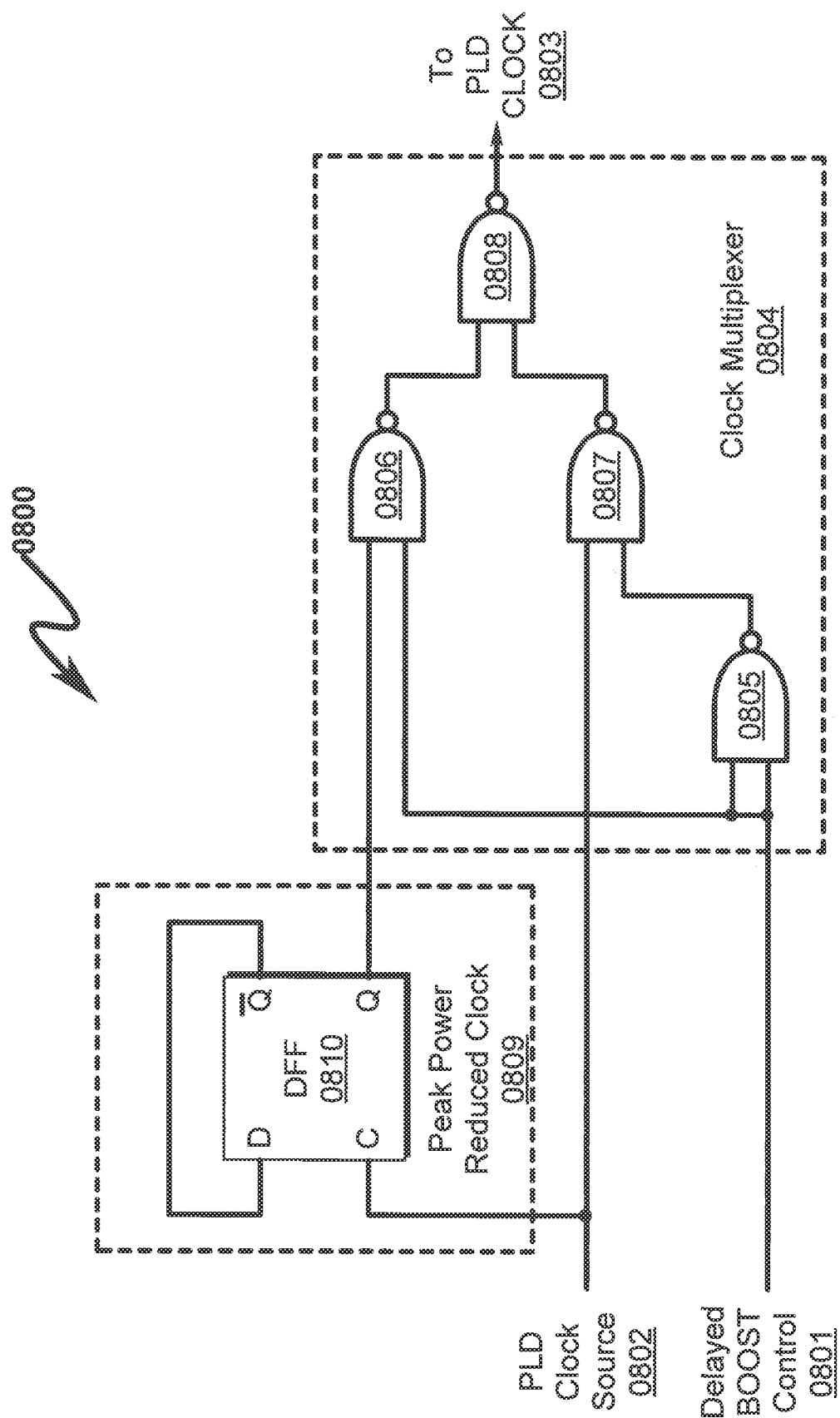
FIG. 8 illustrates a block diagram of a preferred exemplary system embodiment of the present invention detailing generation of a CLOCK control signal having a clock frequency determined in part by a measured intermediate power bus (IPB) voltage.

As indicated previously, the present invention may in some circumstances modulate the digital clock used to operate the PLD based on peak power detection logic within the system. An example of this is generally depicted in FIG. 8 (0800), wherein a delayed BOOST signal (0801) is generated as indicated previously to indicate a continued drop in the IPB voltage necessitating the addition of supplemental power to the IPB by the secondary power source. In these circumstances the system clock (0802) used by the PLD (0803) is routed directly to the PLD clock input (0803) via a clock multiplexer (0804) comprising logic gates (0805, 0806, 0807, and 0808) when the BOOST signal (0801) is inactive (logic-0). However, when the BOOST signal (0801) is active (logic-1), a peak power reduced clock (0809) (shown comprising the divide-by-2 D-flip-flop (0810) fed by the system clock (0802)) is selected instead and used to operate the PLD (0803). This peak power reduced clock (0809) will by necessity reduce the operating power required by the PLD and mitigate the peak power demands of the PLD, moving the IPB voltage towards the PLL trip point. In some circumstances this may eliminate the need for activating the BOOST secondary power source or reduce the time in which the secondary power source is in operation.

Exemplary BOOST/CHARGE Configuration (0900)-(1000)

Figure 9:
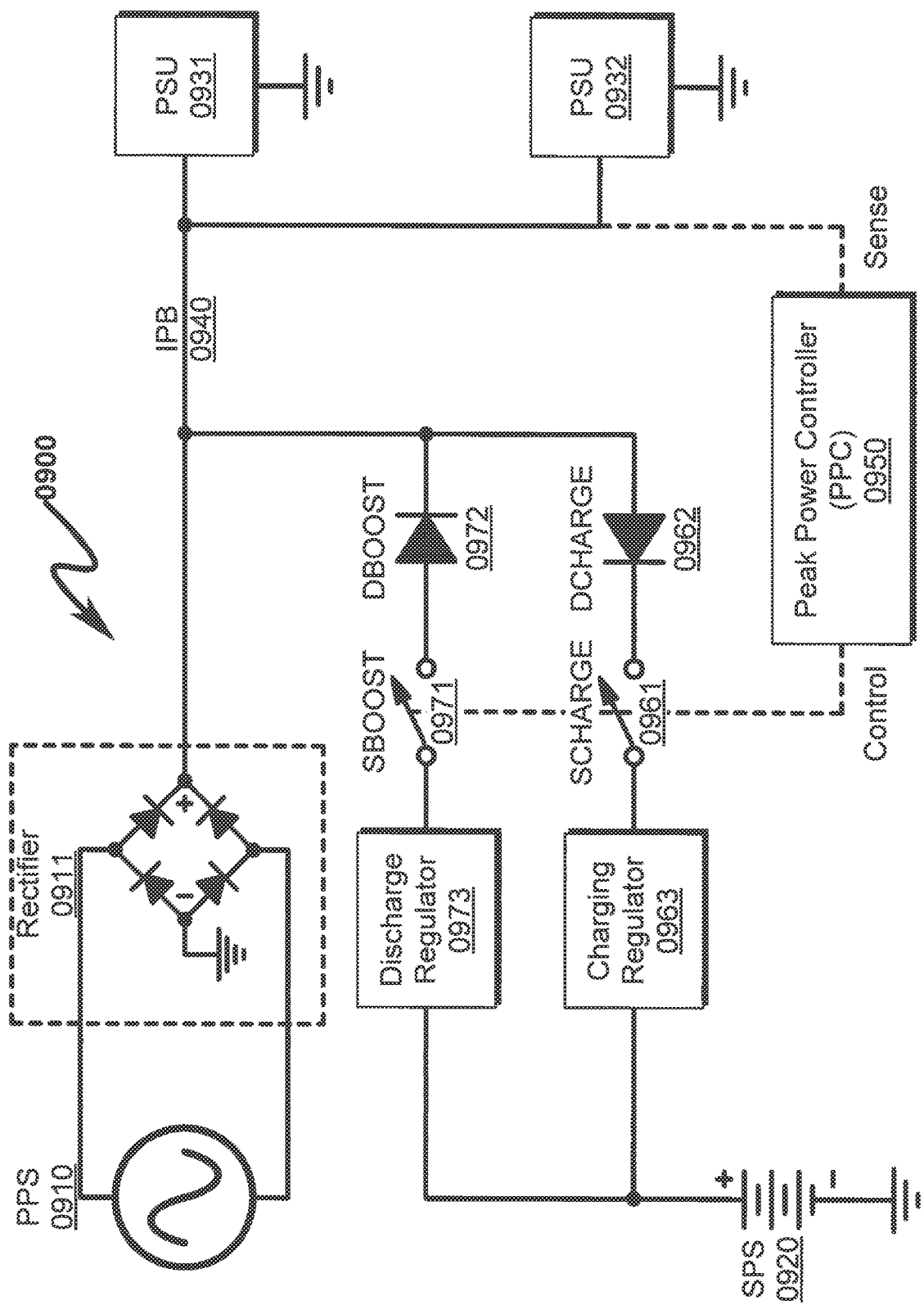
FIG. 9 illustrates a block diagram of a preferred exemplary system embodiment of the present invention wherein a primary power source (PPS) and secondary power source (SPS) are integrated together to supply power to a number of power supply units (PSUs) supporting protective load devices (PLDs)

A preferred exemplary implementation of BOOST/CHARGE configuration current pathways is generally illustrated in FIG. 9 (0900). Here it can be seen that the primary power source (0910) and secondary power source (SPS) (0920) service one or more power supply units (PSU) (0931, 0932) via an intermediate power bus (IPB) (0940). This is accomplished as follows.

Under normal operating conditions power from the PPS (0910) flows through the rectifier (0911) to supply the power requirement of the PSU (0931, 0932) via the IPB (0940). In this condition if the PPS (0910) is sufficient to support the PSU (0931, 0932) loading and maintain a required level of IPB (0940) voltage, the peak power controller (PPC) (0950) will deactivate the SBOOST (0971) switch and activate the SCHARGE switch (0961) that permits current to flow from the PPS (0910) through charge blocking diode (0962) to a charging regulator (0963) to recharge the SPS (0920).

When the peak power controller (PPC) (0950) detects a downward IPB (0940) voltage deviation indicating increased PSU (0931, 0932) loading, the PPC (0950) will disconnect the SCHARGE switch (0961) and activate the SBOOST (0971) switch to enable current to flow from the SPS (0920) through a discharge blocking diode (0972) and discharge regulator (0973) to the IPB (0940).

Figure 10:
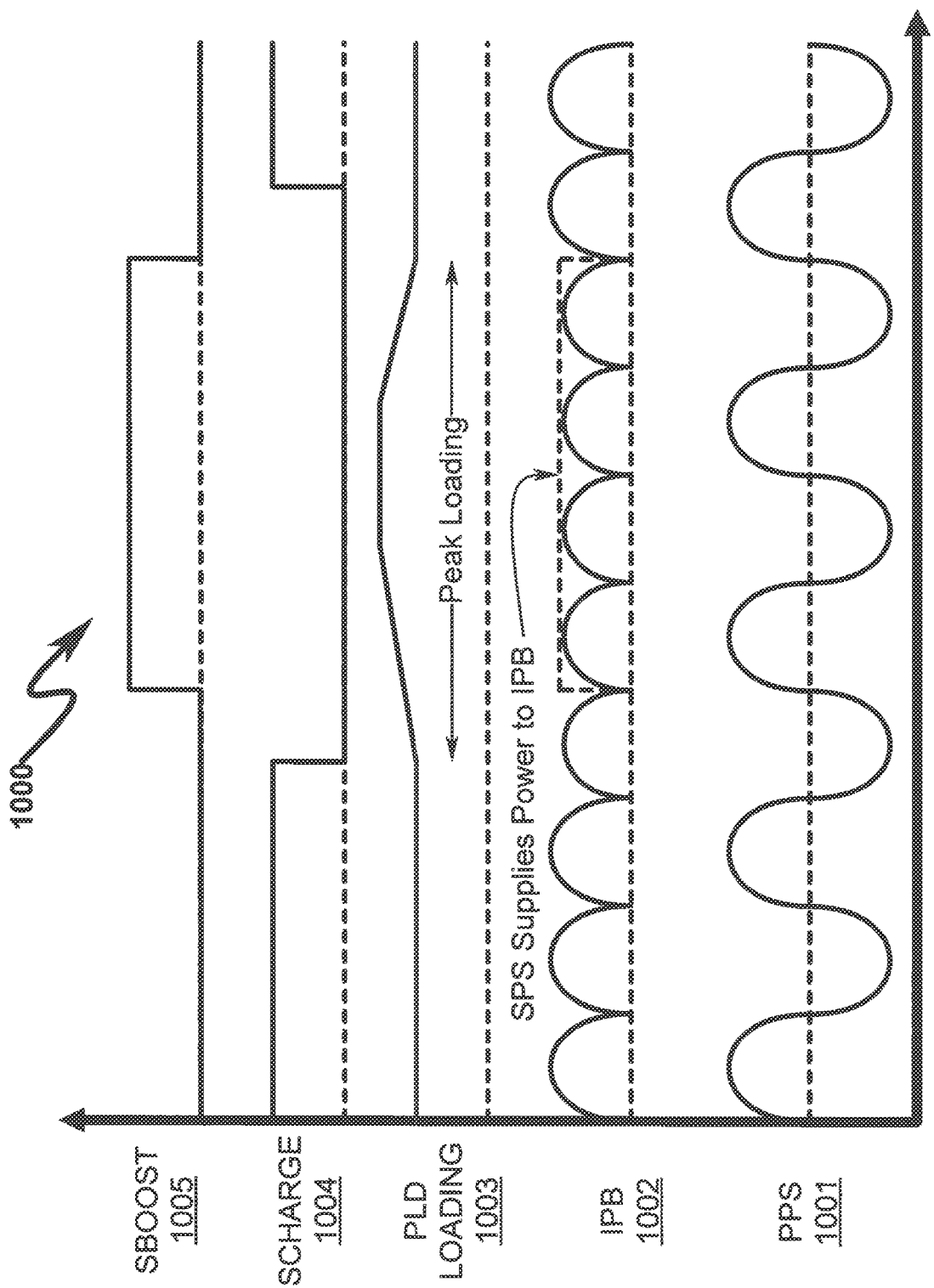
FIG. 10 illustrates a timing diagram depicting operation of the exemplary circuitry presented in FIG. 9.

These operational characteristics are also depicted in FIG. 10 (1000) that illustrate the PPS (1001) unrectified waveform, the IPB (1002) voltage waveform (including areas in which the IPB is supported by the SPS), the PLD loading (1003), the SCHARGE switch activation state (1004), and the SBOOST switch activation state (1005).

Tiered Secondary Power Source (SPS) (1100)-(1200)

Figure 11:
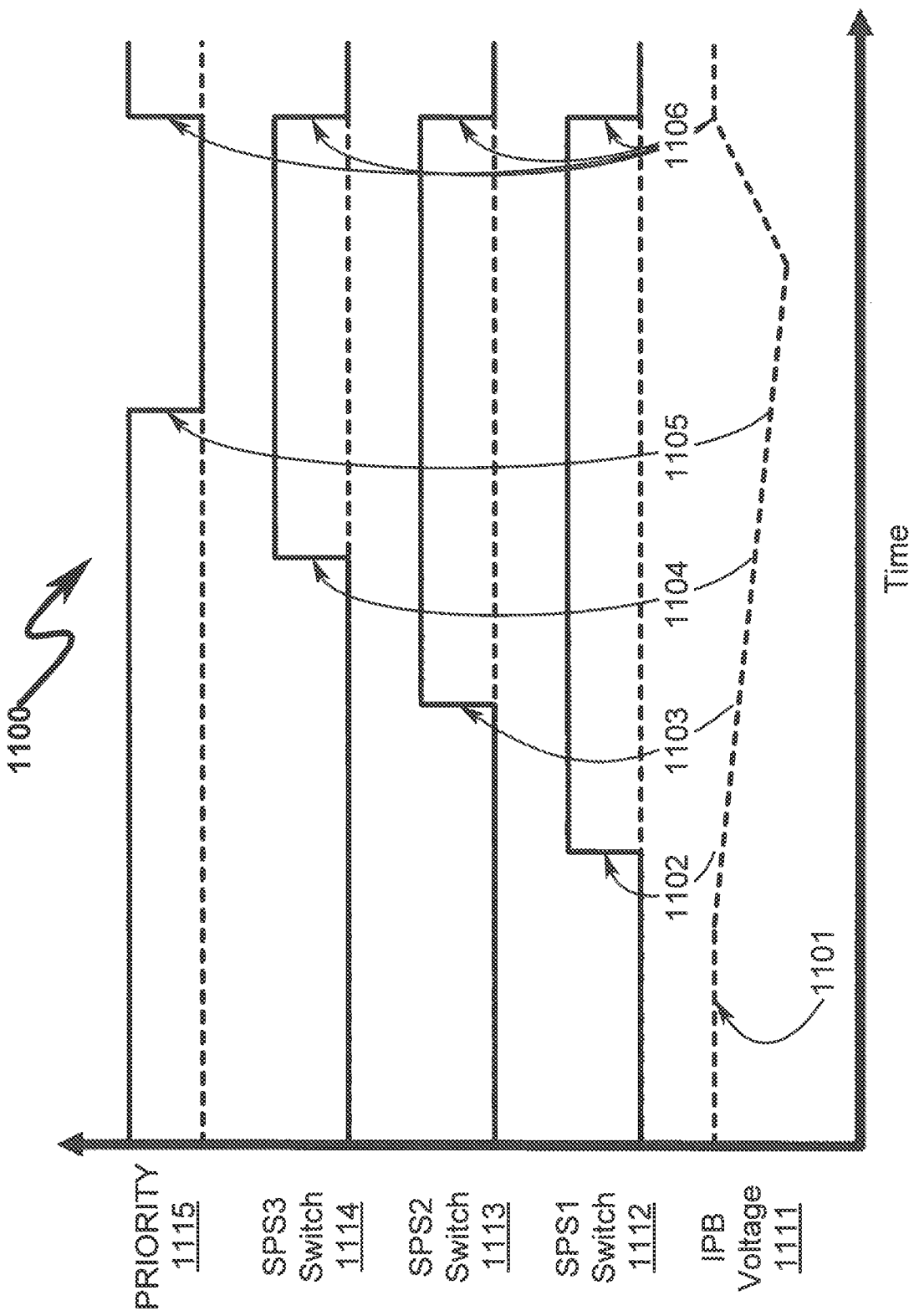
FIG. 11 illustrates a timing diagram depicting operation of a preferred exemplary system embodiment employing tiered integration of secondary power sources (SPS) to supply peak power demands of a PLD.

The present invention anticipates that a number of secondary power sources may be combined to support the peak loading demands of the PLD above the PLL. In this configuration, multiple SPS are maintained and the IPB voltage monitoring is adjusted to enable incremental SPS sourcing of PLD loading demands above the PLL in a stepped or tiered fashion. An example of this behavior is depicted in the signal graph of FIG. 11 (1100) wherein the time-variant IPB bus voltage (1111) is depicted along with the BOOST switches associated with SPS power sources (1112, 1113, 1114) and an exemplary PRIORITY signal (1115) used to modulate the operational processing priority of the PLD.

Each of the depicted BOOST switches (1112, 1113, 1114) controls whether the corresponding SPS power source is electrically coupled to the IPB in order to BOOST the IPB voltage and maintain sufficient power flow to the power supply supporting the PLD. Note as the IPB bus voltage (1111) is sensed at a nominal value (1101) that the BOOST SPS switches (1112, 1113, 1114) are inactive and the PRIORITY signal (1115) is at a logic-1 indicating authorized high priority operation for the PLD. As the IPB bus voltage drops to a predetermined level (1102), a first SPS BOOST switch is enabled (1112) to connect additional power sources to the IPB in an attempt to raise the IPB bus voltage to the PLL. As the PLD load increases, the IPB bus voltage decreases further (1103) and a second SPS BOOST switch is enabled (1113) to raise the IPB bus voltage to the PLL. If the PLD load continues to increase further dropping the IPB bus voltage (1104), this process continues with a third SPS BOOST switch is enabled (1114) to raise the IPB bus voltage to the PLL. If these additional power sources are unable to sufficiently raise the IPB bus voltage (1105), then the PRIORITY signal (1115) is deactivated in an attempt to lower the operational priority of the PLD. As the IPB bus loading is reduced, the SPS BOOST switches are released (1106) and the PRIORITY signal (1115) is enabled to raise the operational priority of the PLD to a normal operational state.

While this example provides for three SPS power sources and PRIORITY modulation, one skilled in the art will recognize that any number of SPS power sources can be implemented using this technique and that PRIORITY modulation can occur in discrete stages, be associated with a scaling factor based on the detected PLD loading, and/or be directed at specific PLD elements within the system.

Figure 12:
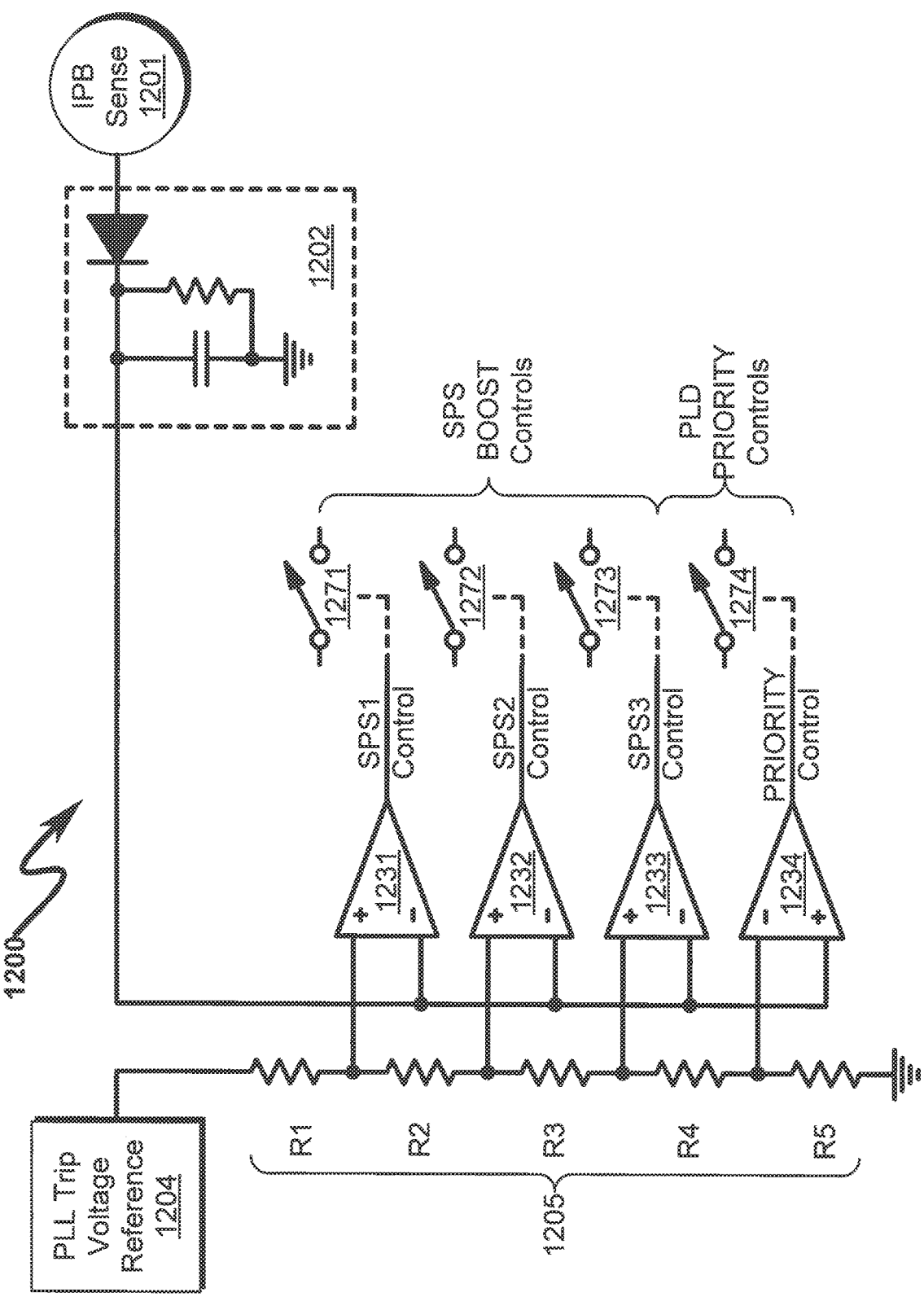
FIG. 12 illustrates an exemplary schematic of a present invention embodiment incorporating tiered switching of secondary power sources (SPS) based on PLD loading.

An exemplary preferred embodiment of this technique is detailed in the schematic of FIG. 12 (1200), wherein the sensed IPB voltage (1201) is filtered (1202) and simultaneously compared by a cascade of comparators (1231, 1232, 1233, 1234) using a trip reference voltage generator (1204) and associated resistor ladder (1205) to produce SPS BOOST switch controls (1271, 1272, 1273) and a PRIORITY switch control (1274). As the sensed IPB voltage (1201) sequentially drops below predetermined load levels (PLL) determined by the resistor ladder (1205) taps (R1, R2, R3, R4, and R5) and comparators (1231, 1232, 1233, 1234), the SPS BOOST controls are sequentially activated to allow more backup battery power to be applied to the IPB in an attempt to raise the IPB bus voltage. If this sequential supplement operation fails to correct the IPB voltage, the PRIORITY line is deactivated to reduce the compute priority of the PLD. In some circumstances the PRIORITY line may be replaced by a CLOCK signal that reduces the operating digital clock frequency of the PLD. In some preferred application contexts a combination of PRIORITY and CLOCK modulation may take place to reduce compute priorities as well as modulate the operating clock frequency of the PLD.

Exemplary AC+DC Power Supply Implementation (1300)

Figure 13:
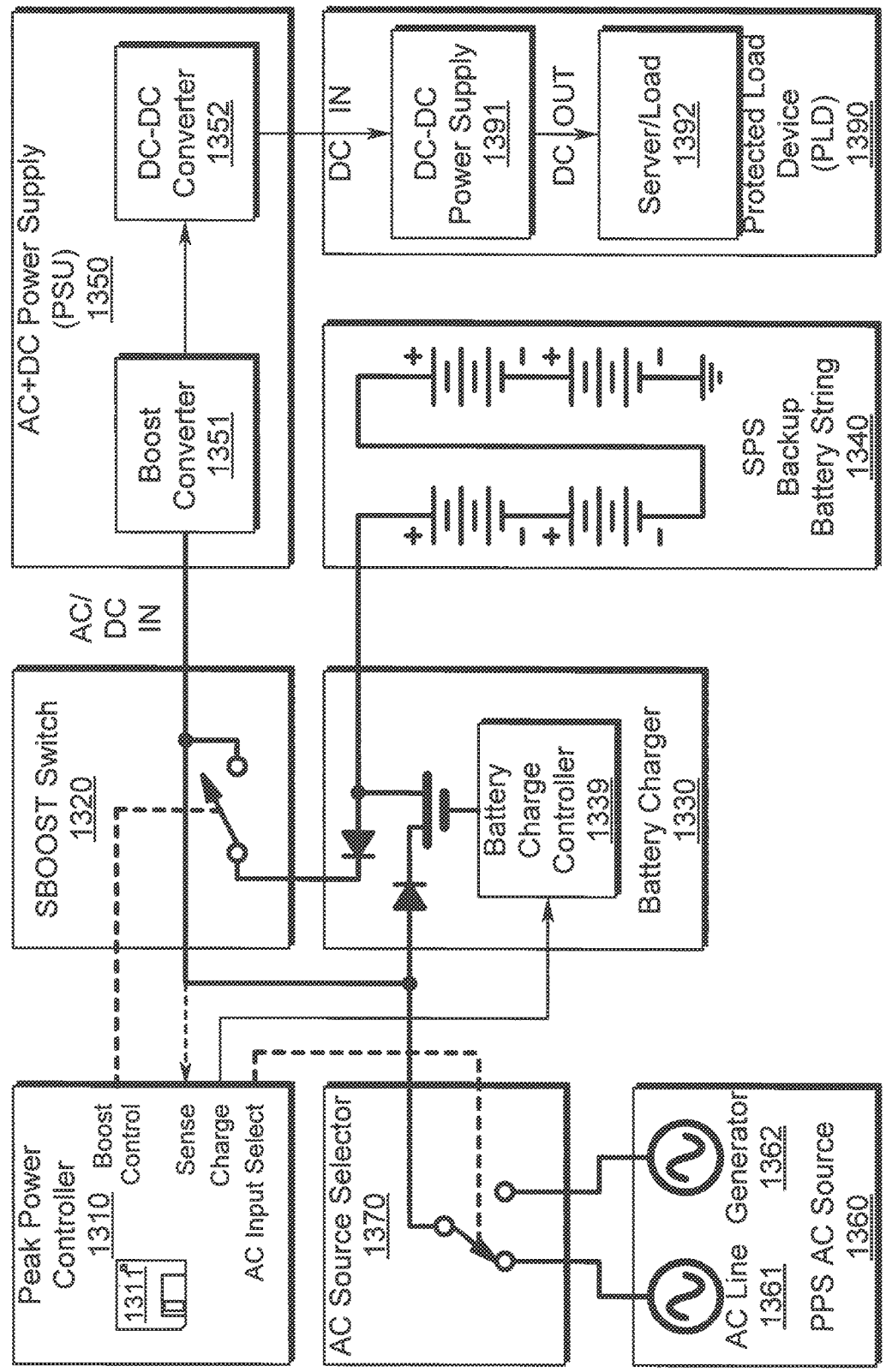
FIG. 13 illustrates a preferred exemplary invention embodiment as integrated within the UPS AC+DC power supply architecture described further in United States patent applications incorporated by reference herein (Ser. Nos. 15/004,585; 14/461,110; and Ser. No. 14/509,454)

The present invention incorporates the teachings of reference patents incorporated by reference herein with respect to the use of AC+DC power supplies in many preferred invention embodiments. A typical system embodiment of the present invention incorporating AC+DC power supplies is depicted in FIG. 13 (1300) wherein a peak power controller (1310) operating under computer control using machine instructions executed from a computer readable medium (1311) operates a BOOST switch (1320) to derive power from a SPS battery string (1340) during periods of peak PLD loading to supply power to an AC+DC power supply (PSU) (1350) and subsequently the PLD (1390). During off-peak PLD loading the PPC (1310) enables a battery charger (1330) to recharge the SPS battery string (1340). The battery charger (1330) may also incorporate a battery charge controller (1339) that assists in the signaling and sensing of control signals for the battery charger (1330). This operational context may be used in conjunction with previously discussed use of multiple PPS sources (1360) that are selected (1370) by the PPC (1310) based on operational status of the PPC power sources (1360), the sensed PLD loading, and state of the PSS battery string (1340).

As with previously discussed AC+DC power supply configurations, the use of the AC+DC power supply simplifies the interface to the PLD (1390) and improves the overall conversion efficiency of the system due to the use of the BOOST converter (1351) and DC-DC converter (1352). During periods of peak power loading the SPS backup battery string (1340) does not require conversion and directly supports the power needs of the AC+DC power supply (1350), thus improving overall system efficiency.

Exemplary Boost/Charge Switch Embodiments (1400)

Figure 14:
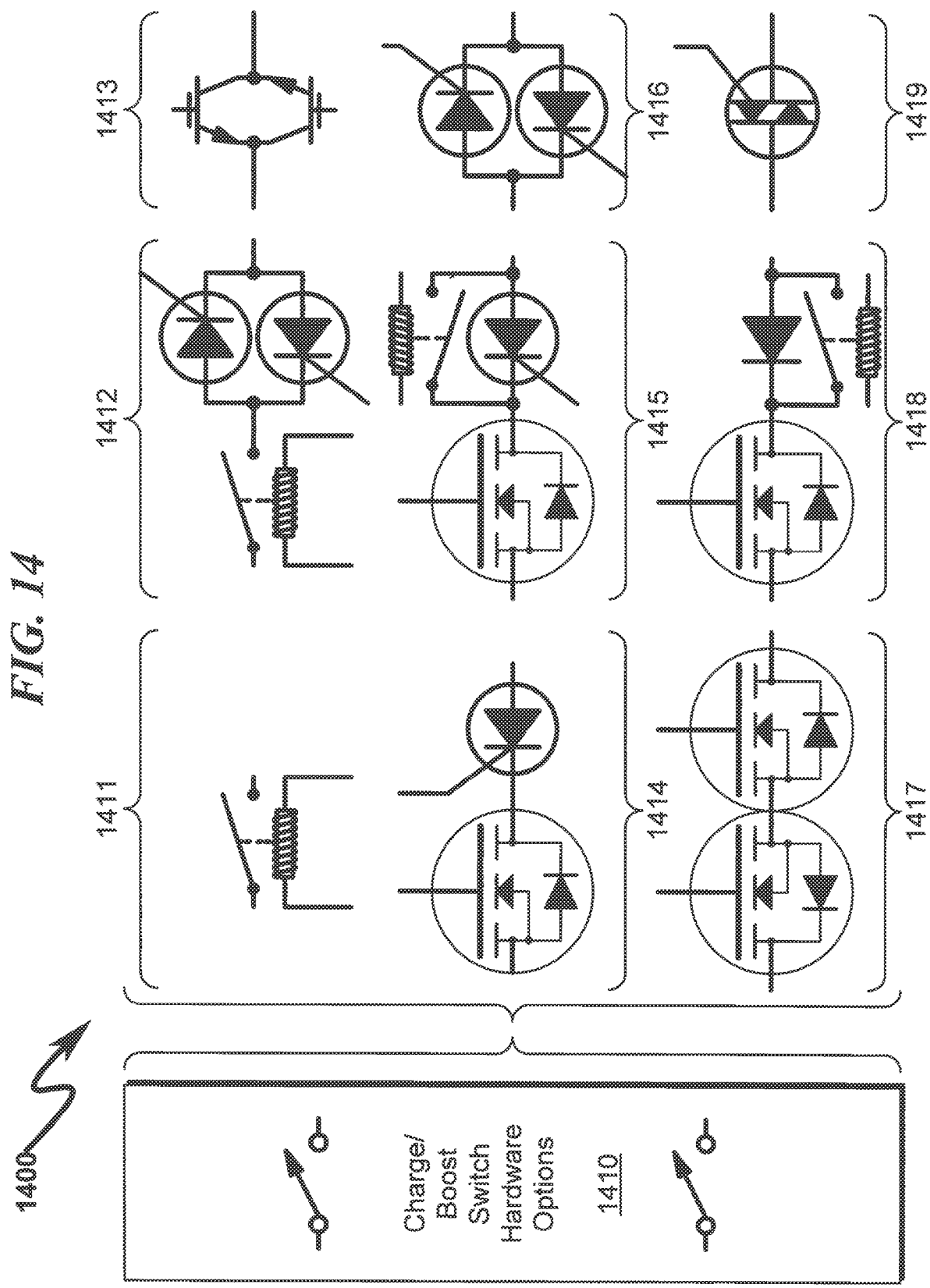
FIG. 14 illustrates exemplary implementations of the SBOOST and SCHARGE switching elements utilized to control operation of the SPS and connections between the SPS and IPB.

While the exact implementation of the CHARGE (0961) and BOOST (0962) switching configurations will be application specific, several preferred embodiments are illustrated in FIG. 14 (1400), wherein the generic CHARGE/BOOST implementation (1410) is implemented in a variety of specific forms (1411, 1412, 1413, 1414, 1415, 1416, 1417, 1418, 1419). One skilled in the art will recognize that these preferred embodiments are not limited of invention scope.

Method Overview (1500)

Figure 15:
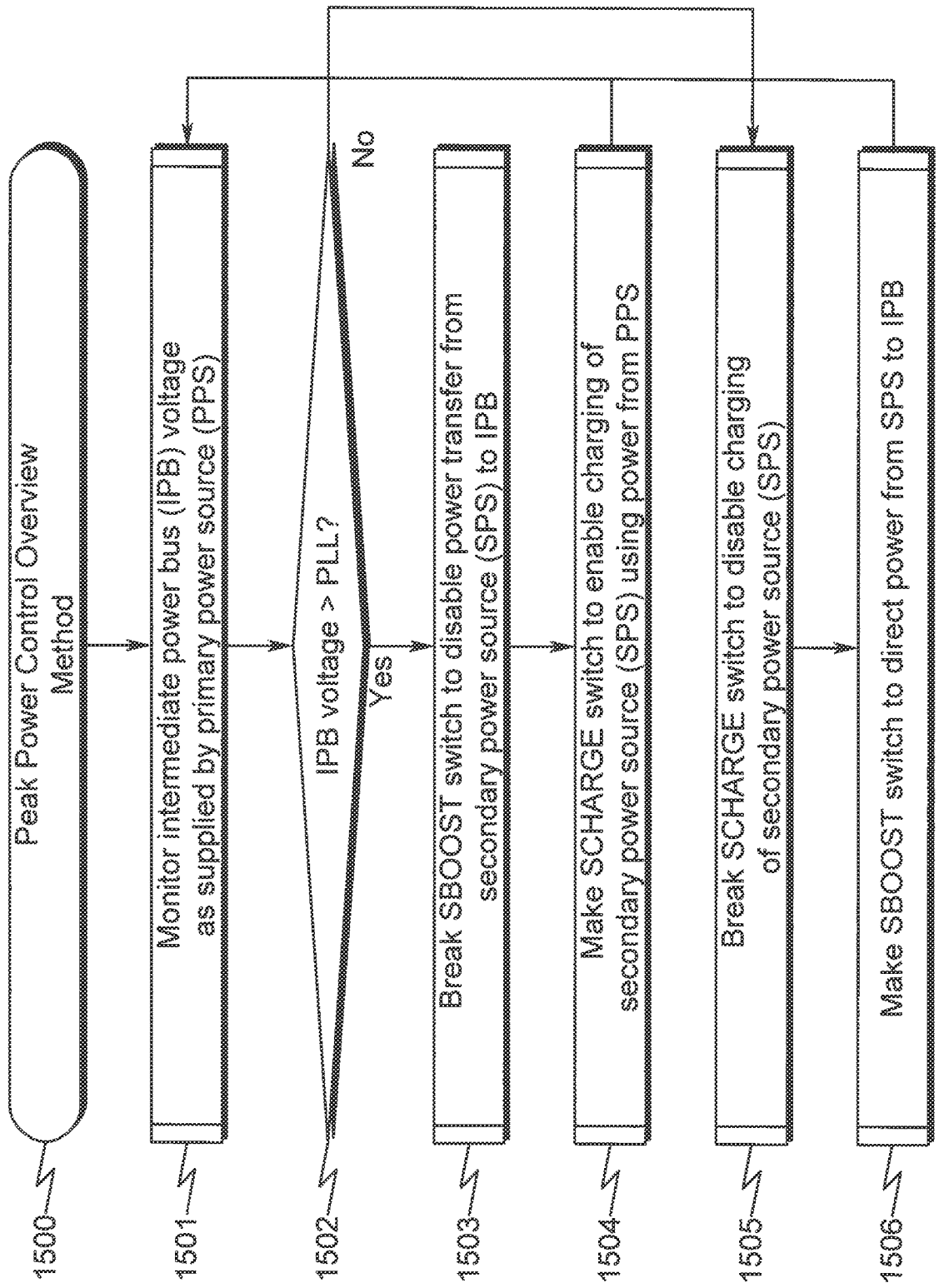
FIG. 15 illustrates a flowchart depicting a preferred exemplary invention method.

The system context as depicted in FIG. 1 (0100) is typically associated with an overall methodology as depicted in FIG. 15 (1500) and involves the following steps:
(1) Monitoring a voltage on an intermediate power bus (IPB) via the SCI as supplied by the primary power source (PPS) (1501);
(2) Determining if the monitored IPB voltage is above a predetermined load level (PLL), and if not, proceeding to step (5) (1502);
(3) Breaking a SBOOST switch via the boost control output (BCO) to disable power transfer from the secondary power source (SPS) to the IPB (1503);
(4) Making a SCHARGE switch via the charge control output (SCO) to enable charging of the secondary power source (SPS) using power from the PPS and proceeding to step (1) (1504);
(5) Breaking the SCHARGE switch via the charge control output (SCO) to disable charging of the secondary power source (SPS) (1505); and
(6) Making the SBOOST switch via the boost control output (BCO) to direct power from the SPS to the IPB and proceeding to step (1) (1506).

One skilled in the art will recognize that these method steps may be augmented or rearranged without limiting the teachings of the present invention. This general method overview may be augmented by the various elements described herein to produce a wide variety of invention embodiments consistent with this overall design description.

Alternative Method Description (1600)

Figure 16:
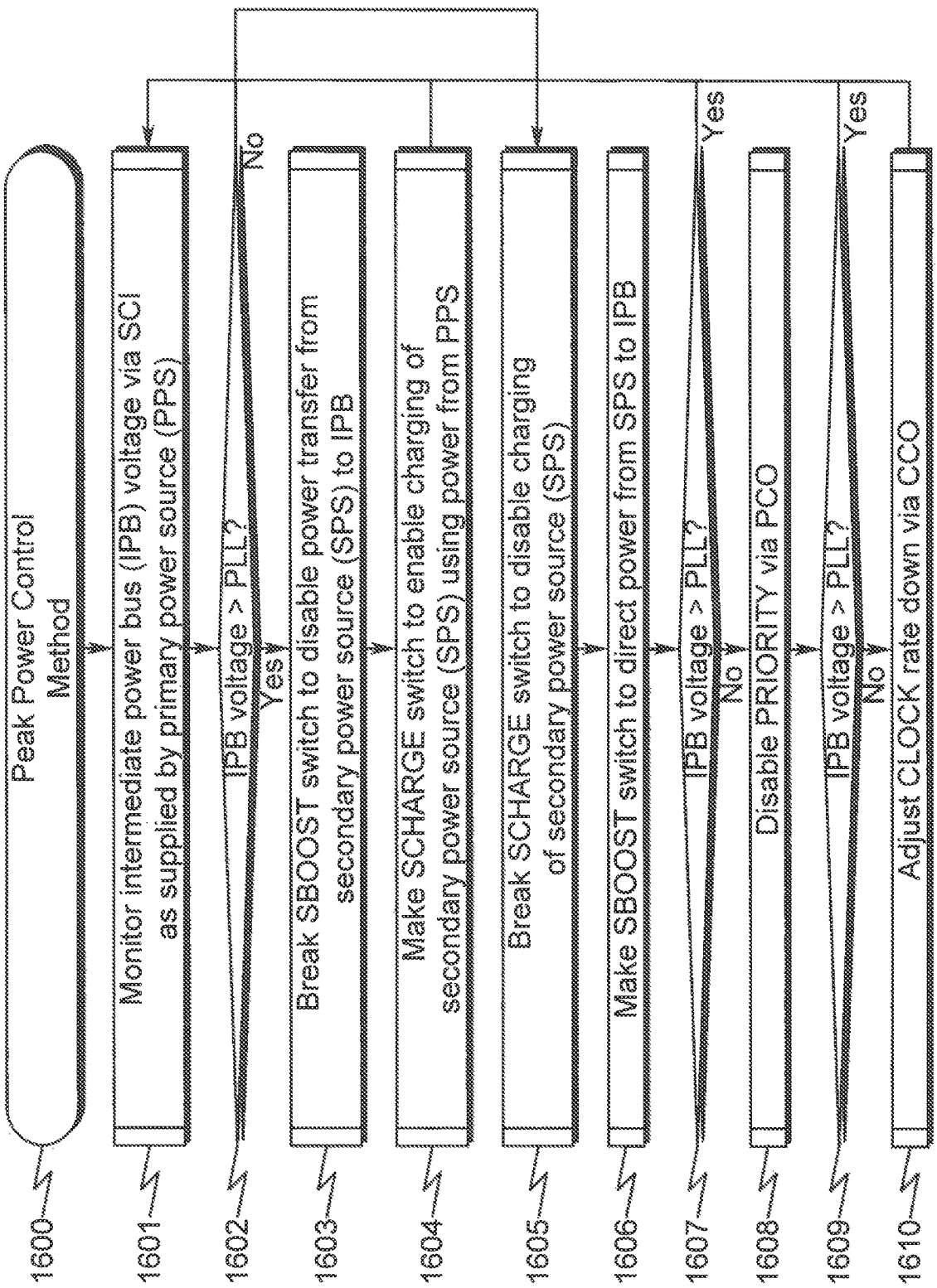
FIG. 16 illustrates a flowchart depicting an alternate preferred exemplary invention method.

The system context as depicted in FIG. 1 (0100) may be typically associated with an overall alternative methodology as depicted in FIG. 16 (1600) and involves the following steps:
(1) Monitoring a voltage on an intermediate power bus (IPB) via the SCI as supplied by the primary power source (PPS) (1601);
(2) Determining if the monitored IPB voltage is above a predetermined load level (PLL), and if not, proceeding to step (5) (1602);
(3) Breaking a SBOOST switch via the boost control output (BCO) to disable power transfer from the secondary power source (SPS) to the IPB (1603);
(4) Making a SCHARGE switch via the charge control output (SCO) to enable charging of the secondary power source (SPS) using power from the PPS and proceeding to step (1) (1604);
(5) Breaking the SCHARGE switch via the charge control output (SCO) to disable charging of the secondary power source (SPS) (1605);
(6) Making the SBOOST switch via the boost control output (BCO) to direct power from the SPS to the IPB (1606);
(7) Determining if the monitored IPB voltage is above a predetermined load level (PLL), and if so, proceeding to step (1) (1607);
(8) disabling the PCO (1608);
(9) determining if the monitored IPB voltage is above a predetermined load level (PLL), and if so, proceeding to step (1) (1609); and
(10) adjusting the CCO clock rate downward and proceeding to step (1) (1610).

This alternative method attempts to meet the PLD peak power requirements with the SPS (one or more backup batteries) and then subsequently reduces the operating priority of the PLD if the load demands are not met. If the SPS and priority reduction cannot satisfy the PLD loading demands, the clock rate of the PLD is reduced thus reducing the PLD loading by a reduction of the dynamic power demanded by the PLD. In any of these scenarios multiple SPS may be added in a tiered fashion, PLD priorities may be reduced in step fashion, and PLD clock rates may be adjusted either in a granular or step fashion. The PLDs impacted by the priority reductions and clock reductions may also be configured in a tiered fashion to enable some PLDs to operate at higher priority and/or clock rates while other PLDs are operated at lower priorities and lower clock rates.

One skilled in the art will recognize that these method steps may be augmented or rearranged without limiting the teachings of the present invention. This general method overview may be augmented by the various elements described herein to produce a wide variety of invention embodiments consistent with this overall design description.

Compute Server Density Improvement (17001-(2400)

The present invention when applied to large data center compute server arrays implemented in standardized rack-mount storage is specifically designed to improve the compute server density within the racks. This improvement in server density directly relates to the economic performance of the server farm as a whole. To illustrate this point a traditional compute server environment comprising a single rack mounted server bay will be illustrated and then compared with that of the present invention.

Figure 17:
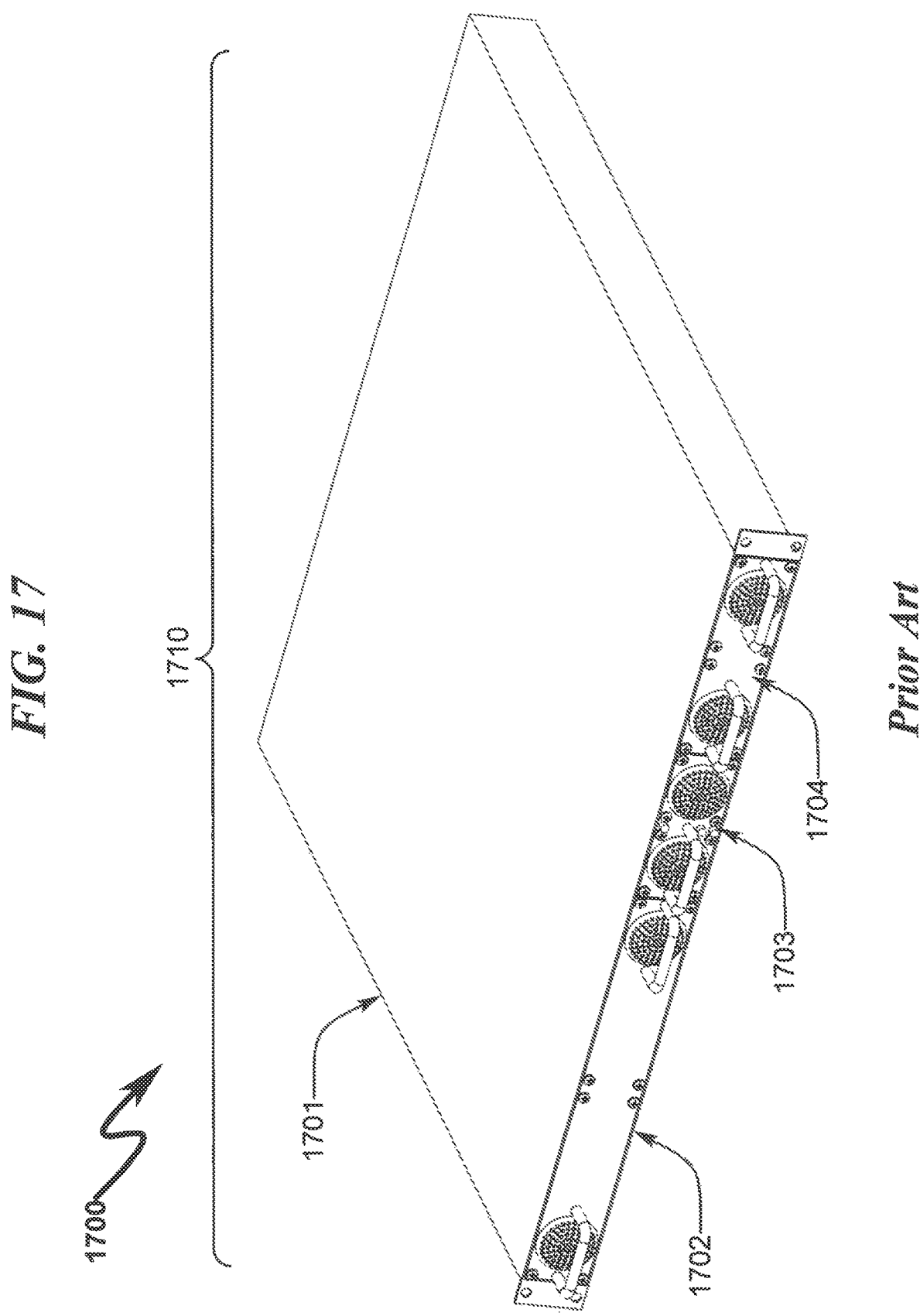
FIG. 17 illustrates a top right front perspective view of a prior art compute server module assembly incorporating compute server, power supply, and backup battery.
Figure 18:
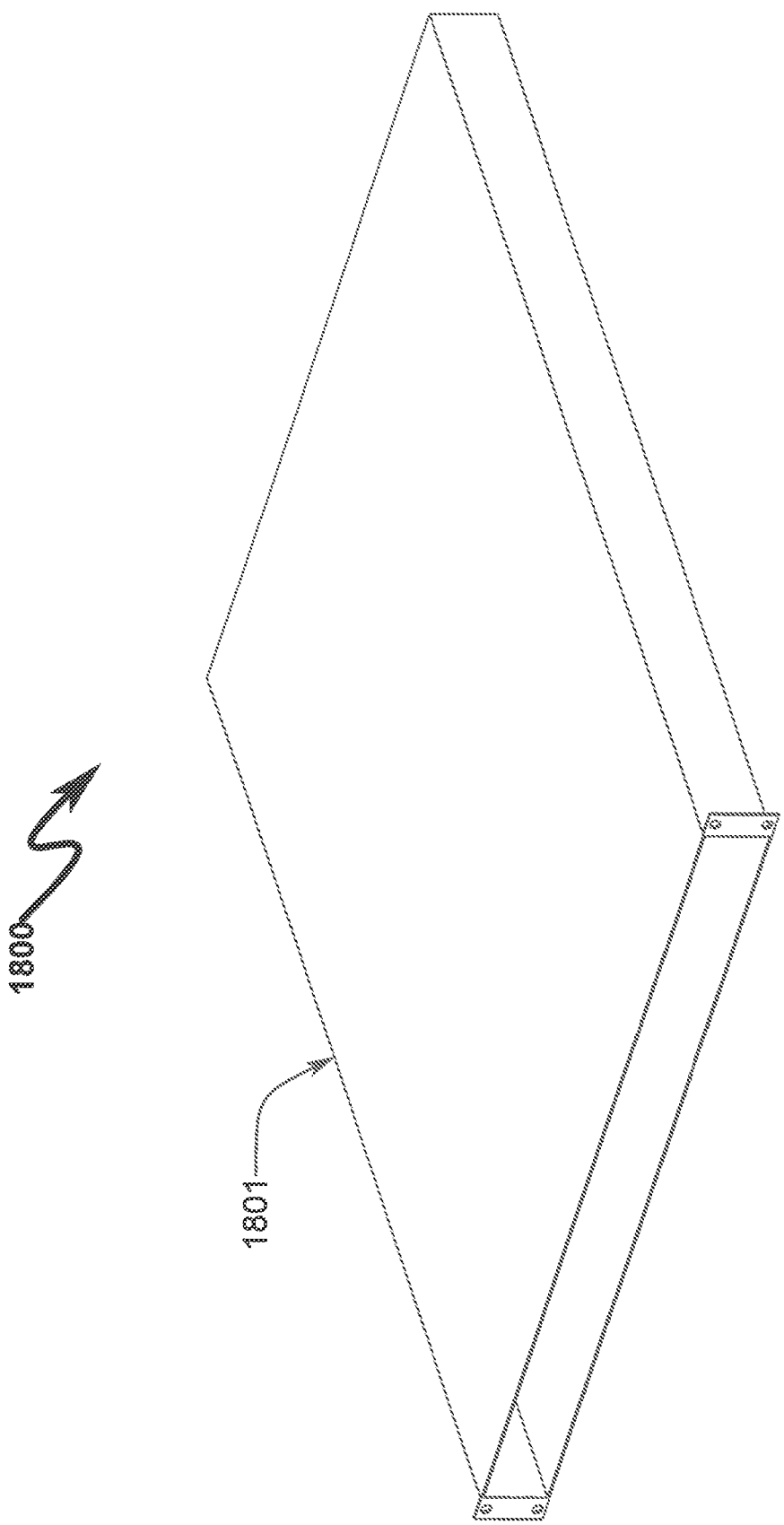
FIG. 18 illustrates a top right front perspective view of a prior art compute server module enclosure absent compute server, power supply, and backup battery.
Figure 19:
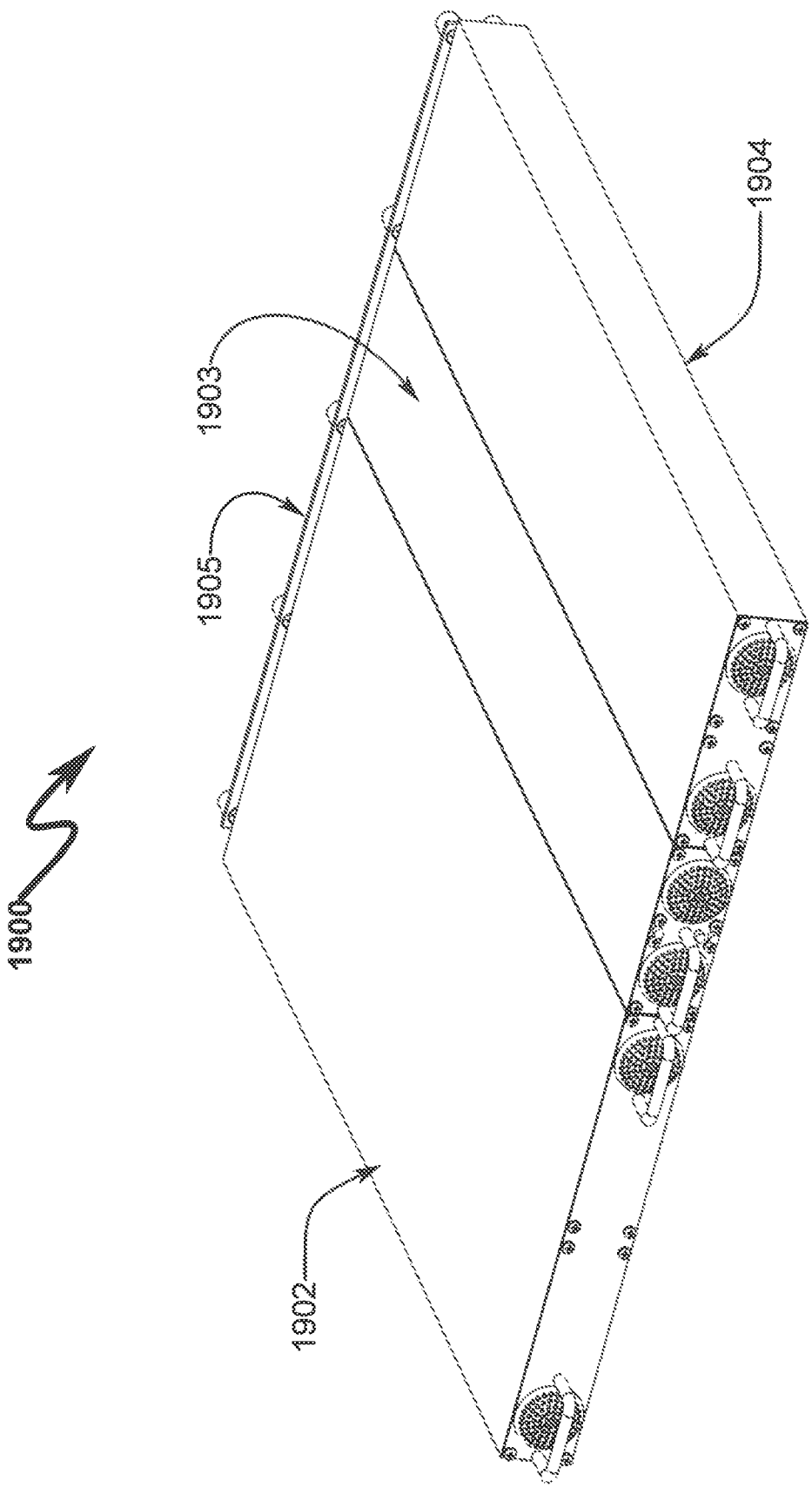
FIG. 19 illustrates a top right front perspective view of a prior art compute server module compute server, power supply, backup battery, and printed circuit board (PSB) backplane absent the server module enclosure.
Figure 20:
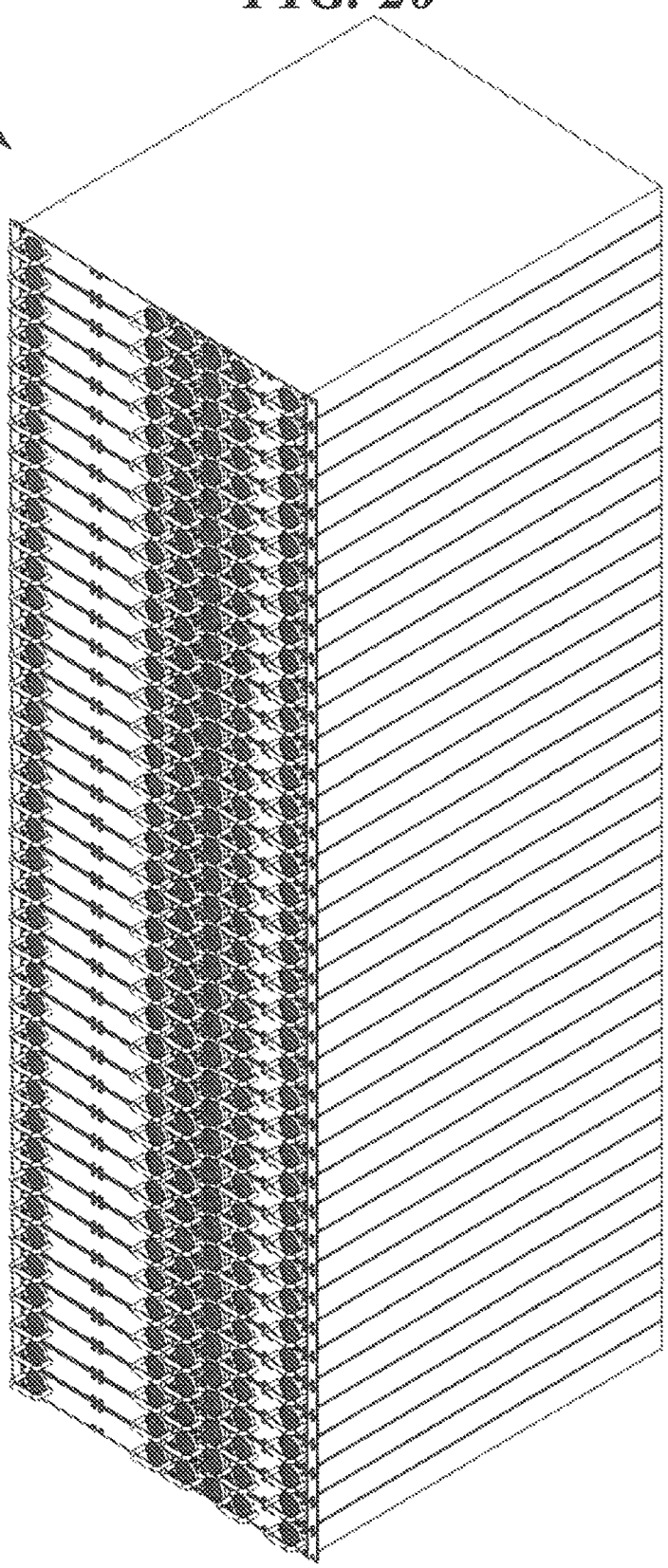
FIG. 20 illustrates a top right front perspective view of a prior art compute server rackmount system incorporating 40 compute server modules each comprising a compute server, power supply, and backup battery.

Referring to FIG. 17 (1700)-FIG. 20 (2000), a traditional rack-mount server module (1710) as generally depicted in FIG. 17 (1700) incorporates a server module enclosure (1701, 1801) (here depicted as a 1 U 1.75-inch height form factor) within which a compute server (1702, 1902), power supply (1703, 1903), and battery backup (1704, 1904) are positioned. The compute server (1702, 1902), power supply (1703, 1903), and backup battery (1704, 1904) are typically wired together via a printed circuit board (PCB) backplane (1905) incorporated within the server module enclosure (1701, 1801). These rack-mount server modules may then be stacked in standardized equipment racks (not illustrated) to provide arrayed computing capabilities within the context of a compute server farm as generally depicted in FIG. 20 (2000). For a typical 1 U (1.75-inch height) compute server module form factor, a standard equipment rack may support approximately 40 compute server modules within the rack assembly supporting a height of 72 inches (6 feet). Note that in this standardized configuration each compute server (1702, 1902) is configured with a power supply (1703, 1903) sufficient to meet the full peak power demands of the compute server (1702, 1902) and backup battery (1704, 1904) is provided to supply power only in the event of a failure of the primary power source (PPS) to the computer server (1702, 1902). Thus, under normal circumstances with provisioned PPS power, the backup battery (1704, 1904) is idle and serves no function in the operation of the compute server (1702, 1902).

Figure 21:
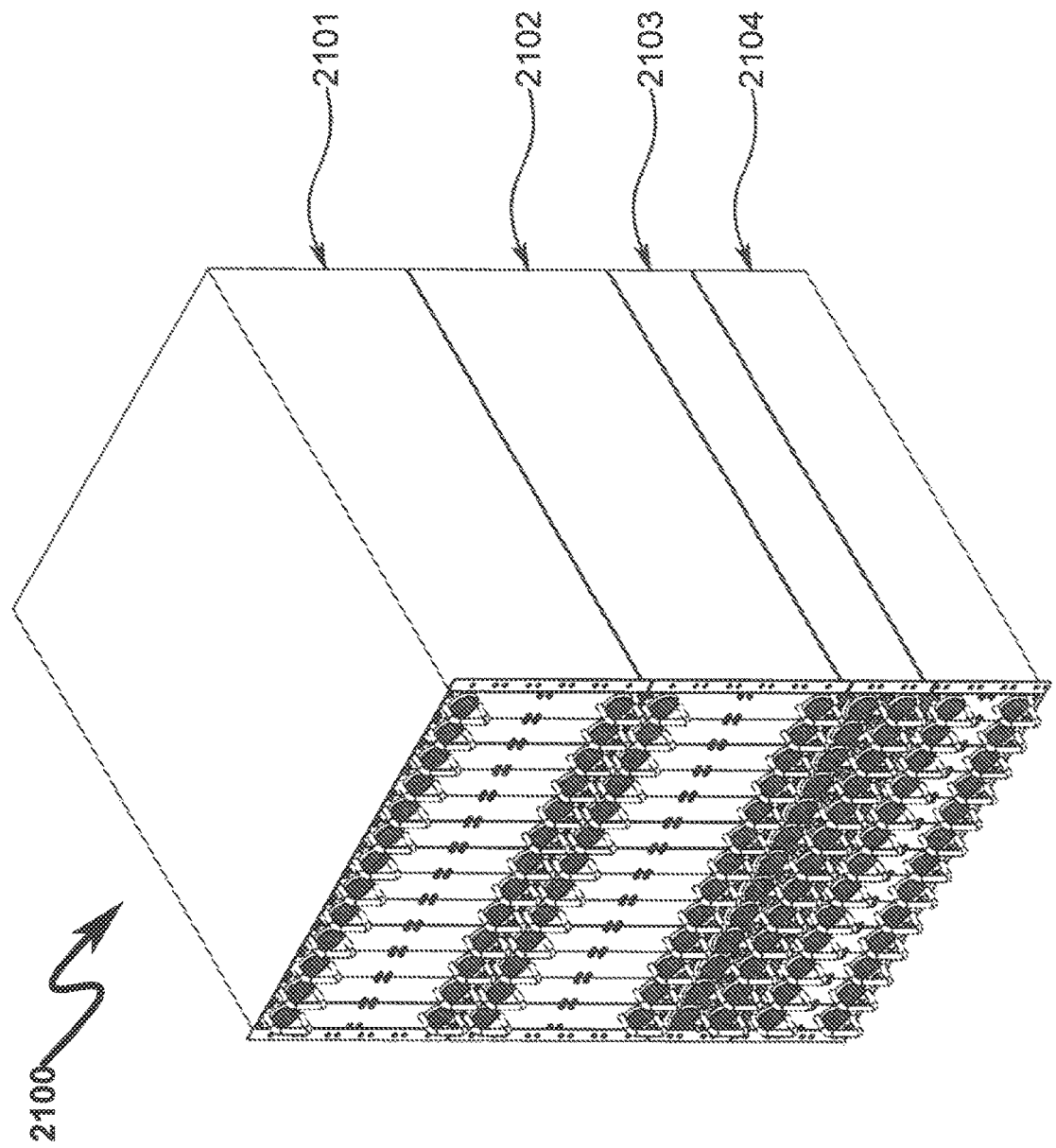
FIG. 21 illustrates a top right front perspective view of a preferred exemplary embodiment of a present invention compute server rackmount system incorporating 26 compute server modules, 13 power supplies, and 13 backup batteries.

In contrast to the prior art configurations depicted in FIG. 17 (1700)-FIG. 20 (2000), an exemplary rackmount configuration implementing the present invention teachings is depicted in FIG. 21 (2100)-FIG. 24 (2400). Here it can be seen that the compute servers (2101, 2102), power supplies (2103), and backup batteries (2104) are positioned in separate racks using the same size form factors as depicted in FIG. 17 (1700)-FIG. 20 (2000), except in this configuration there need only be ONE power supply and ONE backup battery to support TWO compute servers, instead of each compute server requiring a separate power supply and backup battery as depicted in FIG. 17 (1700)-FIG. 20 (2000). This is because each power supply in the depicted configuration of FIG. 21 (2100)-FIG. 24 (2400) is only responsible for half of the peak loading requirements of the compute servers. Additionally, the PSUs depicted may be shared across multiple server modules and thus in some circumstances the PSUs may be configured to support even less than half of the peak power demands of the computer server module. Thus, the power supplies in this configuration are more fully utilized during normal operating conditions. During peak power demands of the compute servers, backup batteries supply the peak power demanded by each compute server above the predetermined load levels (PLL) of the compute servers.

Figure 22:
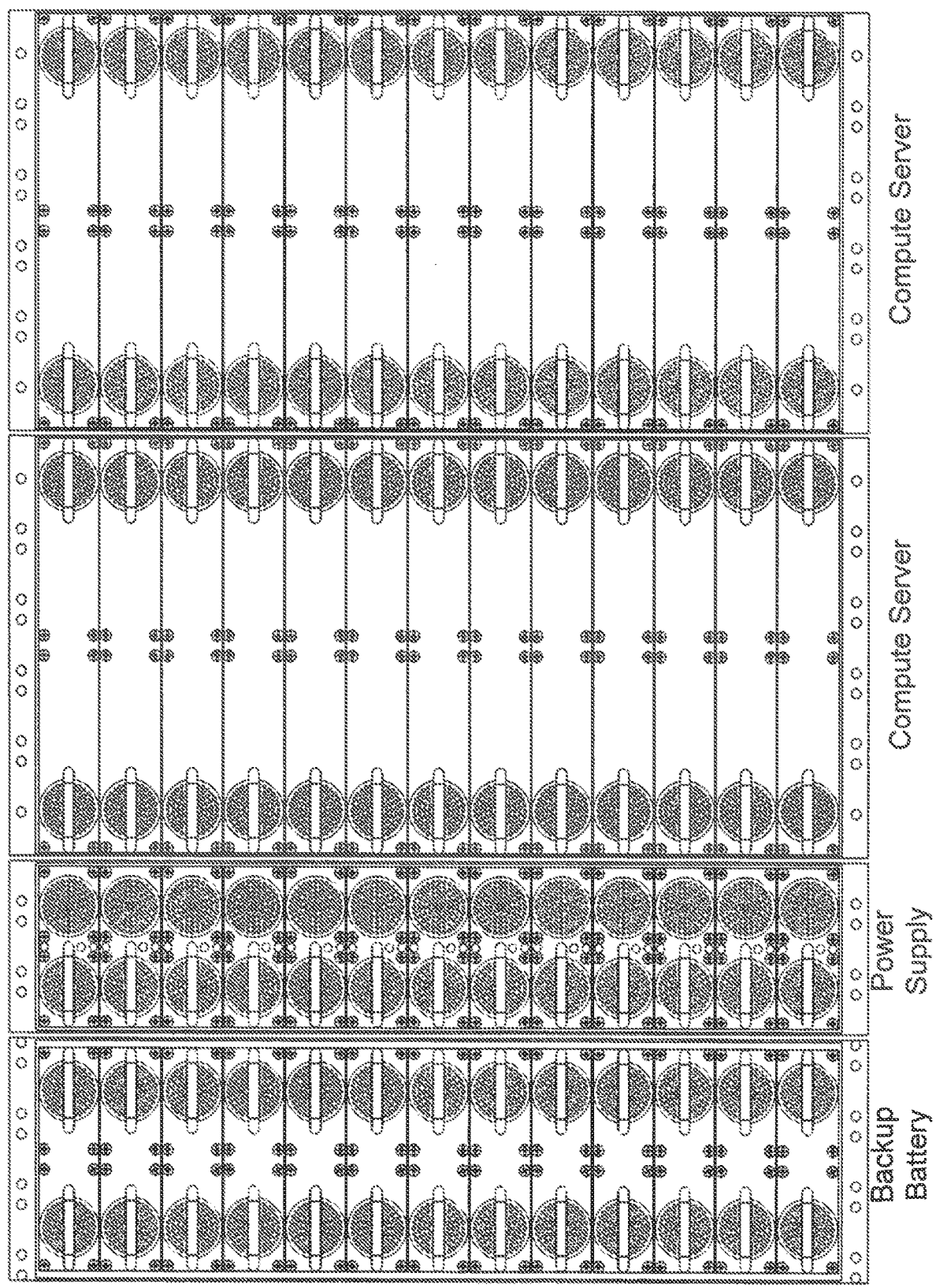
FIG. 22 illustrates a front view of a preferred exemplary embodiment of a present invention compute server rackmount system incorporating 26 compute server modules, 13 power supplies, and 13 backup batteries.
Figure 23:
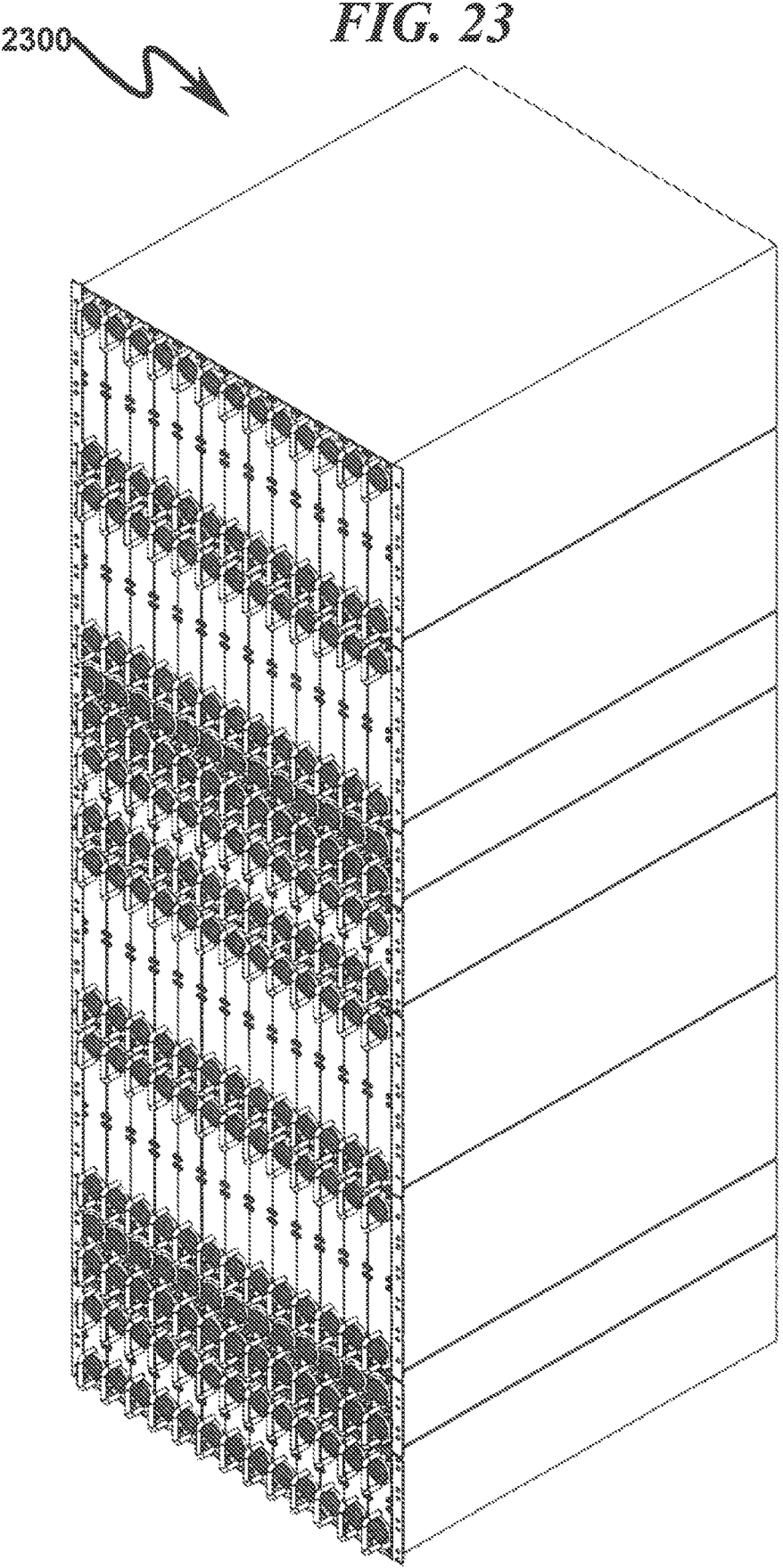
FIG. 23 illustrates a top right front perspective view of a preferred exemplary embodiment of a present invention compute server rackmount system incorporating 52 compute server modules, 26 power supplies, and 26 backup batteries.

An exemplary compute server system supporting 26 compute servers is generally depicted in FIG. 21 (2100)-FIG. 22 (2200) with a corresponding 52 compute server configuration (utilizing two of the configurations depicted in FIG. 21 (2100)-FIG. 22 (2200)) illustrated in FIG. 23 (2300). This 52 compute server configuration of FIG. 23 (2300) is directly compared to prior art server configurations previously discussed in FIG. 24 (2400).

The practical effect of the present invention teachings can be seen in the pictorial comparison illustrated in FIG. 24 (2400) of a prior art rackmount compute server (2401) compared with that of a rackmount server using the present invention teachings (2402). Here it can be seen that the present invention can increases the number of supported compute servers by 30%, reduces the number of required power supplies by 50%, reduces the number of required backup batteries by 50%, and reduces the overall height requirement of the rackmount system by 10%. Furthermore, it should be noted that when servicing the system during the peak loading of the PSUs, the system is more efficient than conventional power supplies as the power required to support the PLDs comes directly from the backup batteries and does not require conversion as would be necessary in a prior art configuration in which power is converted by the PSU to support the IPB.

Preferred Embodiment System Summary

The present invention preferred exemplary system embodiment anticipates a wide variety of variations in the basic theme of construction, but can be generalized as a peak power control system comprising:
  primary power source (PPS);
  secondary power source (SPS);
  peak power controller (PPC);
  boost power switch (BPS);
  switched battery charger (SBC);
  power supply unit (PSU); and
  protected device load (PDL);
  wherein:
  the PPS is electrically coupled to an intermediate power bus (IPB);
  the IPB is electrically coupled to the PSU and supplies power to the PSU;
  the PSU comprises a power supply output that is electrically coupled to supply power to the PDL;
  the PPS is configured to provide only a portion of peak power demand (PPD) required by the PSU to support power consumed by the PDL;
  the SPS comprises a rechargeable battery;
  the PPC is configured to sense a power state condition (PSC) of the PPS via a SENSE control input (SCI) electrically coupled to the IPB;
  the PPC is configured to generate a BOOST control output (BCO) based on the PSC that is electrically coupled to the BPS;
  the PPC is configured to generate a CHARGE control output (SCO) based on the PSC that is electrically coupled to the SBC;
  the PPC is configured to activate the BPS via the BCO when the PPC detects a voltage at the SCI falling below a predetermined loading level (PLL);

the PPC is configured to deactivate the SBC via the SCO
when the PPC detects a voltage at the SCI falling below
the PLL;
the PPC is configured to deactivate the BPS via the BCO
when the PPC detects a voltage at the SCI rising above
the PLL;
the PPC is configured to activate the SBC via the SCO
when the PPC detects a voltage at the SCI rising above
the PLL;
the PSU comprises an intermediate AC+DC power supply
(IDP);
the IDP comprises a boost converter (BCV) further comprising: a BCV input port and BCV output port;
the IDP comprises a DC-DC converter (DDC) further comprising: a DDC input port and DDC output port;
the BCV output port is electrically coupled to the DDC input port;
the PDL comprises a DC-DC power supply (DDP) electrically coupled to a protected load device (PLD); and
the DDC output port is electrically coupled to and supplies power to the DDP.

This general system summary may be augmented by the various elements described herein to produce a wide variety of invention embodiments consistent with this overall design description.

Preferred Embodiment Method Summary

The present invention preferred exemplary method embodiment anticipates a wide variety of variations in the basic theme of implementation, but can be generalized as a peak power control method, the method operating in conjunction with a peak power control system comprising:
(a) primary power source (PPS);
(b) secondary power source (SPS);
(c) peak power controller (PPC);
(d) boost power switch (BPS);
(e) switched battery charger (SBC);
(f) power supply unit (PSU); and
(g) protected device load (PDL);
wherein:
the PPS is electrically coupled to an intermediate power bus (IPB);
the IPB is electrically coupled to the PSU and supplies power to the PSU;
the PSU comprises a power supply output that is electrically coupled to supply power to the PDL;
the PPS is configured to provide only a portion of peak power demand (PPD) required by the PSU to support power consumed by the PDL;
the SPS comprises a rechargeable battery;
the PPC is configured to sense a power state condition (PSC) of the PPS via a SENSE control input (SCI) electrically coupled to the IPB;
the PPC is configured to generate a CLOCK control output (CCO) based on the PSC that is electrically coupled to the PLD;
the PPC is configured to generate a CHARGE control output (SCO) based on the PSC that is electrically coupled to the SBC;
the PPC is configured to activate the BPS via the BCO when the PPC detects a voltage at the SCI falling below a predetermined loading level (PLL);
the PPC is configured to deactivate the SBC via the SCO when the PPC detects a voltage at the SCI falling below the PLL;
the PPC is configured to deactivate the BPS via the BCO when the PPC detects a voltage at the SCI rising above the PLL;
the PPC is configured to activate the SBC via the SCO when the PPC detects a voltage at the SCI rising above the PLL;
the PSU comprises an intermediate AC+DC power supply (IDP);
the IDP comprises a boost converter (BCV) further comprising: a BCV input port and BCV output port;
the IDP comprises a DC-DC converter (DDC) further comprising: a DDC input port and DDC output port;
the BCV output port is electrically coupled to the DDC input port;
the PDL comprises a DC-DC power supply (DDP) electrically coupled to a protected load device (PLD); and
the DDC output port is electrically coupled to and supplies power to the DDP;
wherein the method comprises the steps of:
(1) monitoring a voltage on the IPB via the SCI as supplied by the primary power source (PPS);
(2) determining if the monitored IPB voltage is above a predetermined load level (PLL), and if not, proceeding to step (5);
(3) breaking a SBOOST switch via the boost control output (BCO) to disable power transfer from the secondary power source (SPS) to the IPB;
(4) making a SCHARGE switch via the SCO to enable charging of the SPS using power from the PPS and proceeding to step (1);
(5) breaking the SCHARGE switch via the SCO to disable charging of the SPS; and
(6) making the SBOOST switch via the BCO to direct power from the SPS to the IPB and proceeding to step (1).

One skilled in the art will recognize that these method steps may be augmented or rearranged without limiting the teachings of the present invention. This general method summary may be augmented by the various elements described herein to produce a wide variety of invention embodiments consistent with this overall design description.

Alternate Preferred Embodiment System Summary

An alternate present invention preferred exemplary system embodiment anticipates a wide variety of variations in the basic theme of construction, but can be generalized as a peak power control system comprising:
(a) primary power source (PPS);
(b) secondary power source (SPS);
(c) peak power controller (PPC);
(d) boost power switch (BPS);
(e) switched battery charger (SBC);
(f) power supply unit (PSU); and
(g) protected device load (PDL);
wherein:
the PPS is electrically coupled to an intermediate power bus (IPB);
the IPB is electrically coupled to the PSU and supplies power to the PSU;
the PSU comprises a power supply output that is electrically coupled to supply power to the PDL;
the PPS is configured to provide only a portion of peak power demand (PPD) required by the PSU to support power consumed by the PDL;
the SPS comprises a rechargeable battery;

the PPC is configured to sense a power state condition (PSC) of the PPS via a SENSE control input (SCI) electrically coupled to the IPB;

the PPC is configured to generate a CLOCK control output (CCO) based on the PSC that is electrically coupled to the PLD;

the PPC is configured to generate a PRIORITY control output (PCO) based on the PSC that is electrically coupled to the PLD;

the PPC is configured to generate a BOOST control output (BCO) based on the PSC that is electrically coupled to the BPS;

the PPC is configured to generate a CHARGE control output (SCO) based on the PSC that is electrically coupled to the SBC;

the PPC is configured to activate the BPS via the BCO when the PPC detects a voltage at the SCI falling below a predetermined loading level (PLL);

the PPC is configured to deactivate the SBC via the SCO when the PPC detects a voltage at the SCI falling below the PLL;

the PPC is configured to deactivate the BPS via the BCO when the PPC detects a voltage at the SCI rising above the PLL;

the PPC is configured to activate the SBC via the SCO when the PPC detects a voltage at the SCI rising above the PLL;

the PSU comprises an intermediate AC+DC power supply (IDP);

the IDP comprises a boost converter (BCV) further comprising: a BCV input port and BCV output port;

the IDP comprises a DC-DC converter (DDC) further comprising: a DDC input port and DDC output port;

the BCV output port is electrically coupled to the DDC input port;

the PDL comprises a DC-DC power supply (DDP) electrically coupled to a protected load device (PLD); and the DDC output port is electrically coupled to and supplies power to the DDP.

This general system summary may be augmented by the various elements described herein to produce a wide variety of invention embodiments consistent with this overall design description.

Alternate Preferred Embodiment Method Summary

An alternate present invention preferred exemplary method embodiment anticipates a wide variety of variations in the basic theme of implementation, but can be generalized as a peak power control method, the method operating in conjunction with a peak power control system comprising:
(a) primary power source (PPS);
(b) secondary power source (SPS);
(c) peak power controller (PPC);
(d) boost power switch (BPS);
(e) switched battery charger (SBC);
(f) power supply unit (PSU); and
(g) protected device load (PDL);
wherein:
the PPS is electrically coupled to an intermediate power bus (IPB);
the IPB is electrically coupled to the PSU and supplies power to the PSU; the PSU comprises a power supply output that is electrically coupled to supply power to the PDL;

the PPS is configured to provide only a portion of peak power demand (PPD) required by the PSU to support power consumed by the PDL;

the SPS comprises a rechargeable battery;

the PPC is configured to sense a power state condition (PSC) of the PPS via a SENSE control input (SCI) electrically coupled to the IPB;

the PPC is configured to generate a CLOCK control output (CCO) based on the PSC that is electrically coupled to the PLD;

the PPC is configured to generate a PRIORITY control output (PCO) based on the PSC that is electrically coupled to the PLD;

the PPC is configured to generate a BOOST control output (BCO) based on the PSC that is electrically coupled to the BPS;

the PPC is configured to generate a CHARGE control output (SCO) based on the PSC that is electrically coupled to the SBC;

the PPC is configured to activate the BPS via the BCO when the PPC detects a voltage at the SCI falling below a predetermined loading level (PLL);

the PPC is configured to deactivate the SBC via the SCO when the PPC detects a voltage at the SCI falling below the PLL;

the PPC is configured to deactivate the BPS via the BCO when the PPC detects a voltage at the SCI rising above the PLL;

the PPC is configured to activate the SBC via the SCO when the PPC detects a voltage at the SCI rising above the PLL;

the PSU comprises an intermediate AC+DC power supply (IDP);

the IDP comprises a boost converter (BCV) further comprising: a BCV input port and BCV output port;

the IDP comprises a DC-DC converter (DDC) further comprising: a DDC input port and DDC output port;

the BCV output port is electrically coupled to the DDC input port;

the PDL comprises a DC-DC power supply (DDP) electrically coupled to a protected load device (PLD); and the DDC output port is electrically coupled to and supplies power to the DDP;

wherein the method comprises the steps of:
(1) monitoring a voltage on the IPB via the SCI as supplied by the primary power source (PPS);
(2) determining if the monitored IPB voltage is above a predetermined load level (PLL), and if not, proceeding to step (5);
(3) breaking a SBOOST switch via the boost control output (BCO) to disable power transfer from the secondary power source (SPS) to the IPB;
(4) making a SCHARGE switch via the SCO to enable charging of the SPS using power from the PPS and proceeding to step (1);
(5) breaking the SCHARGE switch via the SCO to disable charging of the SPS;
(6) making the SBOOST switch via the BCO to direct power from the SPS to the IPB;
(7) determining if the monitored IPB voltage is above a predetermined load level (PLL), and if so, proceeding to step (1);
(8) disabling the PCO;
(9) determining if the monitored IPB voltage is above a predetermined load level (PLL), and if so, proceeding to step (1); and

(10) adjusting the CCO clock rate downward and proceeding to step (1).

One skilled in the art will recognize that these method steps may be augmented or rearranged without limiting the teachings of the present invention. This general method summary may be augmented by the various elements described herein to produce a wide variety of invention embodiments consistent with this overall design description.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:

An embodiment wherein the PPC is configured to modulate a digital frequency clock control line in response to a measured voltage at said SCI.

An embodiment wherein the PPC is configured to modulate a digital priority state control line in response to a measured voltage at said SCI.

An embodiment wherein the PPC is configured to modulate a digital state at said BCO in response to a measured voltage at said SCI.

An embodiment wherein the PPC is configured to adjust said PLL based on a measured voltage at said SCI.

An embodiment wherein the PPC is configured to adjust said PLL based on data retrieved from a digital database.

An embodiment wherein the PPC is configured to adjust said PLL based on external environmental data input to said PPC.

An embodiment wherein the PPC comprises a digital computing device executing machine instructions read from a tangible non-transitory computer readable medium.

An embodiment wherein the PSC is sensed by the PPC using multiple comparators operating at different sense threshold voltages.

An embodiment wherein the PSC is sensed by the PPC using a comparator incorporating hysteresis.

One skilled in the art will recognize that other embodiments are possible based on combinations of the embodiments listed above and/or elements taught within the above invention description.

Generalized Computer Usable Medium

In various alternate embodiments, the present invention may be implemented as a computer program product for use with a computerized computing system. Those skilled in the art will readily appreciate that programs defining the functions defined by the present invention can be written in any appropriate programming language and delivered to a computer in many forms, including but not limited to: (a) information permanently stored on non-writeable storage media (e.g., read-only memory devices such as ROMs or CD-ROM disks); (b) information alterably stored on writeable storage media (e.g., floppy disks and hard drives); and/or (c) information conveyed to a computer through communication media, such as a local area network, a telephone network, or a public network such as the Internet. When carrying computer readable instructions that implement the present invention methods, such computer readable media represent alternate embodiments of the present invention.

As generally illustrated herein, the present invention system embodiments can incorporate a variety of computer readable media that comprise computer usable medium having computer readable code means embodied therein. One skilled in the art will recognize that the software associated with the various processes described herein can be embodied in a wide variety of computer accessible media from which the software is loaded and activated. Pursuant to In re Beauregard, 35 USPQ2d 1383 (U.S. Pat. No. 5,710,578), the present invention anticipates and includes this type of computer readable media within the scope of the invention. Pursuant to In re Nuijten, 500 F.3d 1346 (Fed. Cir. 2007) (U.S. patent application Ser. No. 09/211,928), the present invention scope is limited to computer readable media wherein the media is both tangible and non-transitory.

CONCLUSION

A peak power control (PPC) system/method providing a uninterruptable power supply (UPS) to one or more protected load devices (PLD) supplied by power supply units (PSU) serviced by a primary power source (PPS) and a secondary power source (SPS) has been disclosed. The PPS is configured to provide only a portion of peak power demand (PPD) required by the PSU to support the PLD power demand. During periods where power supplied by the PPS is insufficient to support the PLD power demand, the SPS augments the power supplied to the PSU to meet the PLD power demand. During periods where power supplied by the PPS is sufficient to meet the PLD power demand, the SPS is recharged by any excess power available from the PPS. Power provisioning controls (PPC) generate state control information (SCI) instructing the PLD to modulate computing clock speeds and/or prioritize PLD computing tasks in real-time.

What is claimed is:

1. A peak power control system comprising:
(a) primary power source;
(b) secondary power source;
(c) peak power controller;
(d) boost power switch;
(e) switched battery charger; and
(f) power supply unit;
wherein:
said primary power source is electrically coupled to an intermediate power bus;
said intermediate power bus is electrically coupled to said power supply unit and supplies power to said power supply unit;
said secondary power source is electrically coupled to said boost power switch and said switched battery charger;
said peak power controller is configured to sense a power state condition of said primary power source via a SENSE control input electrically coupled to said intermediate power bus;
said peak power controller is configured to activate said boost power switch via a BOOST control output when said peak power controller detects a voltage at said SENSE control input falling below a predetermined loading level; and
said peak power controller is configured to deactivate said switched battery charger via a CHARGE control output when said peak power controller detects said voltage at said SENSE control input falling below said predetermined loading level,
wherein said peak power controller is configured to modulate a digital frequency clock control line in response to a measured voltage at said SENSE control input.

2. The peak power control system of claim 1 wherein said peak power controller is configured to adjust said predetermined loading level based on a measured voltage at said SENSE control input.

3. The peak power control system of claim 1 wherein said peak power controller is configured to adjust said predetermined loading level based on data retrieved from a digital database.

4. The peak power control system of claim 1 wherein said peak power controller is configured to adjust said predetermined loading level based on external environmental data input to said peak power controller.

5. The peak power control system of claim 1 wherein said peak power controller comprises a digital computing device executing machine instructions read from a tangible non-transitory computer readable medium.

6. The peak power control system of claim 1 wherein said power state condition is sensed by said peak power controller using multiple comparators operating at different sense threshold voltages.

7. The peak power control system of claim 1 wherein said power state condition is sensed by said peak power controller using a comparator incorporating hysteresis.

8. The peak power control system of claim 1 wherein:
said power supply unit comprises a power supply output that is electrically coupled to supply power to a protected device load;
said primary power source is configured to provide only a portion of peak power demand required by said power supply unit to support power consumed by said protected device load; and
said secondary power source comprises a rechargeable battery.

9. The peak power control system of claim 8 wherein:
said peak power controller is configured to generate a CLOCK control output based on said power state condition that is electrically coupled to said protected device load;
said peak power controller is configured to generate said CHARGE control output based on said power state condition that is electrically coupled to said switched battery charger;
said peak power controller is configured to generate a PRIORITY control output based on said power state condition that is electrically coupled to said protected device load; and
said peak power controller is configured to generate said BOOST control output based on said power state condition that is electrically coupled to said boost power switch.

10. The peak power control system of claim 8 wherein:
said power supply unit comprises an intermediate AC+DC power supply;
said intermediate AC+DC power supply comprises a boost converter further comprising: a boost converter input port and boost converter output port;
said intermediate AC+DC power supply comprises a DC-DC converter further comprising: a DC-DC converter input port and DC-DC converter output port;
said boost converter output port is electrically coupled to said DC-DC converter input port;
said protected device load comprises a DC-DC power supply electrically coupled to a protected load device; and
said DC-DC converter output port is electrically coupled to and supplies power to said DC-DC power supply.

11. The peak power control system of claim 1 wherein:
said peak power controller is configured to deactivate said boost power switch via said BOOST control output when said peak power controller detects said voltage at said SENSE control input rising above said predetermined loading level; and
said peak power controller is configured to activate said switched battery charger via said CHARGE control output when said peak power controller detects said voltage at said SENSE control input rising above said predetermined loading level.

12. The peak power control system of claim 1 wherein:
said peak power controller deactivate a SCHARGE switch via said CHARGE control output to disable charging of said secondary power source when said voltage at said SENSE control input is below said predetermined loading level;
said peak power controller activate a SBOOST switch via said BOOST control output to direct power from said secondary power source to said intermediate power bus when said voltage at said SENSE control input is below said predetermined loading level;
said peak power controller deactivate said SBOOST switch via said BOOST control output to disable power transfer from said secondary power source to said intermediate power bus when said voltage at said SENSE control input is above said predetermined loading level; and
said peak power controller activate said SCHARGE switch via said CHARGE control output to enable charging of said secondary power source using power from said primary power source when said voltage at said SENSE control input is above said predetermined loading level.

13. A peak power control system comprising:
(a) primary power source;
(b) secondary power source;
(c) peak power controller;
(d) boost power switch;
(e) switched battery charger; and
(f) power supply unit;
wherein:
said primary power source is electrically coupled to an intermediate power bus;
said intermediate power bus is electrically coupled to said power supply unit and supplies power to said power supply unit;
said secondary power source is electrically coupled to said boost power switch and said switched battery charger;
said peak power controller is configured to sense a power state condition of said primary power source via a SENSE control input electrically coupled to said intermediate power bus;
said peak power controller is configured to activate said boost power switch via a BOOST control output when said peak power controller detects a voltage at said SENSE control input falling below a predetermined loading level; and said peak power controller is configured to deactivate said switched battery charger via a CHARGE control output when said peak power controller detects said voltage at said SENSE control input falling below said predetermined loading level, wherein said peak power controller is configured to modulate a digital priority state control line in response to a measured voltage at said SENSE control input.

14. A peak power control system comprising:
(a) primary power source;
(b) secondary power source;
(c) peak power controller;
(d) boost power switch;
(e) switched battery charger; and
(f) power supply unit;
wherein:
said primary power source is electrically coupled to an intermediate power bus;
said intermediate power bus is electrically coupled to said power supply unit and supplies power to said power supply unit;

said secondary power source is electrically coupled to said boost power switch and said switched battery charger;

said peak power controller is configured to sense a power state condition of said primary power source via a SENSE control input electrically coupled to said intermediate power bus;

said peak power controller is configured to activate said boost power switch via a BOOST control output when said peak power controller detects a voltage at said SENSE control input falling below a predetermined loading level; and said peak power controller is configured to deactivate said switched battery charger via a CHARGE control output when said peak power controller detects said voltage at said SENSE control input falling below said predetermined loading level, wherein said peak power controller is configured to modulate a digital state at said BOOST control output in response to a measured voltage at said SENSE control input.

* * * * *